United States Patent
Manolakos et al.

(10) Patent No.: US 10,873,481 B2
(45) Date of Patent: Dec. 22, 2020

(54) REFERENCE SIGNAL TRANSMISSION WINDOW AND TIMING CONSIDERATIONS

(71) Applicant: QUALCOMM Incorporated, San Diego, CA (US)

(72) Inventors: Alexandros Manolakos, San Diego, CA (US); Alberto Rico Alvarino, San Diego, CA (US); Ayan Sengupta, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/198,624

(22) Filed: Nov. 21, 2018

(65) Prior Publication Data

US 2019/0165971 A1 May 30, 2019

(30) Foreign Application Priority Data

Nov. 27, 2017 (GR) .............................. 20170100535

(51) Int. Cl.
*H04L 25/02* (2006.01)
*H04L 5/00* (2006.01)
*H04W 72/14* (2009.01)
*H04W 88/08* (2009.01)
*H04W 88/02* (2009.01)

(52) U.S. Cl.
CPC ........ *H04L 25/0202* (2013.01); *H04L 5/0048* (2013.01); *H04L 5/0091* (2013.01);
(Continued)

(58) Field of Classification Search
CPC ............... H04L 25/0202; H04L 5/0091; H04L 25/0226; H04L 5/0048; H04L 5/001;
(Continued)

(56) References Cited

U.S. PATENT DOCUMENTS 8,897,253 B2 * 11/2014 Shin ...................... H04L 5/0044
370/330
9,565,641 B2 * 2/2017 Ouchi ....................... H04L 5/14
(Continued)

OTHER PUBLICATIONS

Huawei, et al., "Remaining Details of SRS Design," 3GPP Draft; R1-1719441, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017, XP051369331, 12 pages, Retrieved from the Internet: URL: http://www.3gpp.org/ftp/tsg%5Fran/WG1%5FRL1/TSGR1%5F91/Docs/ [retrieved on Nov. 18, 2017].
(Continued)

*Primary Examiner* — Sharad Rampuria
(74) *Attorney, Agent, or Firm* — Holland & Hart LLP

(57) ABSTRACT

Methods, systems, and devices for wireless communications are described. These wireless communications may include channel estimation procedures between communicating devices such as a base station and user equipment (UE). For example, the UE may receive, from the base station, a resource grant triggering a given reference signal configuration. Based at least in part on the type of reference signal configuration, the UE (e.g., and the base station) may determine a timing offset relative to the resource grant. The UE may transmit (and the base station may receive) the reference signal based at least in part on the timing offset. In some cases, the reference signal may be transmitted in a transmission opportunity of a set of transmission opportunities, where the set of transmission opportunities is determined based at least in part on the reference signal configuration.

30 Claims, 21 Drawing Sheets

(52) U.S. Cl.
CPC ......... *H04L 25/0226* (2013.01); *H04W 72/14* (2013.01); *H04L 5/001* (2013.01); *H04W 88/02* (2013.01); *H04W 88/08* (2013.01)

(58) Field of Classification Search
CPC ..... H04W 72/14; H04W 88/08; H04W 88/02; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 10,667,288 B2* | 5/2020 | Chendamarai Kannan | ................. H04L 5/0053 |
| 2018/0063736 A1* | 3/2018 | Sadeghi | ................ H04W 24/10 |
| 2018/0368175 A1* | 12/2018 | Jeon | ..................... H04W 72/04 |

OTHER PUBLICATIONS

International Search Report and Written Opinion—PCT/US2018/062485—ISA/EPO—dated Feb. 13, 2019.

Mitsubishi Electric: "Views on SRS Designs," 3GPP Draft; R1-1711643-SRS_SRSSEDID_MITBS_MOD_D, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 27, 2017, XP051305904, 10 pages, Retrieved from the Internet: URL: http://www.3gpp.org/ftp/tsg_ran/WG1_RL1/TSGR1_AH/NR_AH_1706/Docs/ [retrieved on Jun. 27, 2017].

Qualcomm Incorporated, Remaining Issues on Non-codebook Based UL Transmission, R1-1720658, 3GPP TSG RAN WG1, Meeting #91, Dec. 1, 2017, 4 pages.

* cited by examiner

REFERENCE SIGNAL TRANSMISSION WINDOW AND TIMING CONSIDERATIONS

CROSS REFERENCE

The present Application for patent claims the benefit of Greece Provisional Patent Application No. 20170100535 by Manolakos, et al., entitled "REFERENCE SIGNAL TRANSMISSION WINDOW AND TIMING CONSIDERATIONS," filed Nov. 27, 2017, assigned to the assignee hereof, and expressly incorporated herein by reference in its entirety.

BACKGROUND

The following relates generally to wireless communication, and more specifically to reference signal transmission window and timing considerations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-s-OFDM).

A wireless multiple-access communications system may include a number of base stations or network access nodes, each simultaneously supporting communication for multiple communication devices, which may be otherwise known as user equipment (UE). To support such communications, base stations and UEs may cooperate to obtain estimates of channel conditions. Channel estimation may include channel sounding, by which a UE transmits an uplink reference signal (e.g., a sounding reference signal (SRS)) that a base station uses to determine information about the channel between itself and the UE. Channel sounding may be performed in conjunction with one or more other operations (e.g., feedback of channel state information (CSI), data acknowledgement, etc.). The amount of time required for channel sounding may vary depending on the type of sounding being performed, the type of grant triggering the sounding, a processing capability of the UE, etc.

SUMMARY

The described techniques relate to improved methods, systems, devices, or apparatuses that support reference signal transmission window and timing considerations. Generally, the described techniques provide for variations in SRS timing and/or transmission windows. For example, for an aperiodic SRS triggered by a resource grant (e.g., which may be a downlink resource grant or an uplink resource grant), the SRS timing may depend on the SRS type, the resource grant type, etc. By way of example, SRS that is associated with CSI acquisition may employ a larger timing offset between the resource grant and SRS transmission (e.g., to allow CSI to be computed) than SRS that is not associated with CSI acquisition. Various SRS timing considerations are described below. Additionally or alternatively, SRS transmission may be based at least in part on a transmission opportunity window. For example, a UE may identify a transmission opportunity window that begins after a timing offset has elapsed following the resource grant triggering the SRS. The transmission opportunity window may be associated with a given duration and periodicity of transmission opportunities within the transmission opportunity window, as discussed further below. In accordance with the described techniques, a UE may sequentially attempt to access transmission opportunities of the transmission opportunity window until a successful SRS transmission is performed.

A method of wireless communication is described. The method may include receiving, from a base station, a resource grant triggering a reference signal configuration, determining a timing offset relative to the resource grant based at least in part on the reference signal configuration, and transmitting a reference signal based at least in part on the timing offset.

An apparatus for wireless communication is described. The apparatus may include means for receiving, from a base station, a resource grant triggering a reference signal configuration, means for determining a timing offset relative to the resource grant based at least in part on the reference signal configuration, and means for transmitting a reference signal based at least in part on the timing offset.

Another apparatus for wireless communication is described. The apparatus may include a processor, memory in electronic communication with the processor, and instructions stored in the memory. The instructions may be operable to cause the processor to receive, from a base station, a resource grant triggering a reference signal configuration, determine a timing offset relative to the resource grant based at least in part on the reference signal configuration, and transmit a reference signal based at least in part on the timing offset.

A non-transitory computer-readable medium for wireless communication is described. The non-transitory computer-readable medium may include instructions operable to cause a processor to receive, from a base station, a resource grant triggering a reference signal configuration, determine a timing offset relative to the resource grant based at least in part on the reference signal configuration, and transmit a reference signal based at least in part on the timing offset.

Some examples of the method, apparatus, and non-transitory computer-readable medium described above may further include processes, features, means, or instructions for identifying a transmission opportunity window comprising a plurality of transmission opportunities based at least in part on the timing offset, where the reference signal may be transmitted during a transmission opportunity of the plurality of transmission opportunities.

Some examples of the method, apparatus, and non-transitory computer-readable medium described above may further include processes, features, means, or instructions for determining a duration of the transmission opportunity window or a periodicity of the transmission opportunities based at least in part on the reference signal configuration.

In some examples of the method, apparatus, and non-transitory computer-readable medium described above, the periodicity of the transmission opportunities may include a number of symbols, a number of slots, a number of bandwidth parts, or a combination thereof.

Some examples of the method, apparatus, and non-transitory computer-readable medium described above may further include processes, features, means, or instructions for receiving a channel state information reference signal (CSI- RS) based at least in part on the reference signal configuration. Some examples of the method, apparatus, and non-transitory computer-readable medium described above may further include processes, features, means, or instructions for identifying a precoder for the reference signal based at least in part on the CSI-RS.

In some examples of the method, apparatus, and non-transitory computer-readable medium described above, the timing offset may be based at least in part on a processing capability of the UE, a delay associated with the reference signal configuration, or a combination thereof.

Some examples of the method, apparatus, and non-transitory computer-readable medium described above may further include processes, features, means, or instructions for indicating the processing capability of the UE to the base station.

Some examples of the method, apparatus, and non-transitory computer-readable medium described above may further include processes, features, means, or instructions for receiving a data transmission based at least in part on the resource grant. Some examples of the method, apparatus, and non-transitory computer-readable medium described above may further include processes, features, means, or instructions for modulating the reference signal based at least in part on the data transmission.

Some examples of the method, apparatus, and non-transitory computer-readable medium described above may further include processes, features, means, or instructions for receiving the reference signal configuration in a control transmission that precedes the resource grant.

In some examples of the method, apparatus, and non-transitory computer-readable medium described above, a duration of the timing offset may be based at least in part on a directionality of the resource grant, the directionality of the resource grant including downlink or uplink.

In some examples of the method, apparatus, and non-transitory computer-readable medium described above, the reference signal configuration includes an indication of a use case for the reference signal. In some examples of the method, apparatus, and non-transitory computer-readable medium described above, the indicated use case includes an uplink channel state information acquisition, or a downlink channel state information acquisition, or an uplink non-codebook-based precoding, or an uplink codebook-based precoding, or an uplink analog beamforming.

In some examples of the method, apparatus, and non-transitory computer-readable medium described above, the reference signal configuration includes a first timing offset for a first component carrier and a second timing offset for a second component carrier. In some examples of the method, apparatus, and non-transitory computer-readable medium described above, the first component carrier and the second component carrier operate in different radio frequency spectrum bands.

In some examples of the method, apparatus, and non-transitory computer-readable medium described above, the reference signal comprises a sounding reference signal.

A method of wireless communication is described. The method may include transmitting, to a UE, a resource grant indicating a reference signal configuration, determining a timing offset relative to the resource grant based at least in part on the reference signal configuration, and receiving a reference signal based at least in part on the timing offset.

An apparatus for wireless communication is described. The apparatus may include means for transmitting, to a UE, a resource grant indicating a reference signal configuration, means for determining a timing offset relative to the resource grant based at least in part on the reference signal configuration, and means for receiving a reference signal based at least in part on the timing offset.

Another apparatus for wireless communication is described. The apparatus may include a processor, memory in electronic communication with the processor, and instructions stored in the memory. The instructions may be operable to cause the processor to transmit, to a UE, a resource grant indicating a reference signal configuration, determine a timing offset relative to the resource grant based at least in part on the reference signal configuration, and receive a reference signal based at least in part on the timing offset.

A non-transitory computer-readable medium for wireless communication is described. The non-transitory computer-readable medium may include instructions operable to cause a processor to transmit, to a UE, a resource grant indicating a reference signal configuration, determine a timing offset relative to the resource grant based at least in part on the reference signal configuration, and receive a reference signal based at least in part on the timing offset.

Some examples of the method, apparatus, and non-transitory computer-readable medium described above may further include processes, features, means, or instructions for identifying a transmission opportunity window including a plurality of transmission opportunities based at least in part on the timing offset, where the reference signal may be transmitted during a transmission opportunity of the plurality of transmission opportunities.

Some examples of the method, apparatus, and non-transitory computer-readable medium described above may further include processes, features, means, or instructions for determining a duration of the transmission opportunity window or a periodicity of the transmission opportunities based at least in part on the reference signal configuration.

In some examples of the method, apparatus, and non-transitory computer-readable medium described above, the periodicity of the transmission opportunities may include a number of symbols, a number of slots, a number of bandwidth parts, or a combination thereof.

Some examples of the method, apparatus, and non-transitory computer-readable medium described above may further include processes, features, means, or instructions for transmitting a CSI-RS based at least in part on the reference signal configuration.

In some examples of the method, apparatus, and non-transitory computer-readable medium described above, the timing offset may be based at least in part on a processing capability of the UE, a delay associated with the reference signal configuration, or a combination thereof.

Some examples of the method, apparatus, and non-transitory computer-readable medium described above may further include processes, features, means, or instructions for receiving an indication of the processing capability of the UE.

Some examples of the method, apparatus, and non-transitory computer-readable medium described above may further include processes, features, means, or instructions for indicating the reference signal configuration in a control transmission that precedes the resource grant.

In some examples of the method, apparatus, and non-transitory computer-readable medium described above, a duration of the timing offset may be based at least in part on a directionality of the resource grant, the directionality of the resource grant including downlink or uplink.

In some examples of the method, apparatus, and non-transitory computer-readable medium described above, the reference signal configuration includes an indication of a use case for the reference signal. In some examples of the method, apparatus, and non-transitory computer-readable medium described above, the indicated use case includes an uplink channel state information acquisition, or a downlink channel state information acquisition, or an uplink non-codebook-based precoding, or an uplink codebook-based precoding, or an uplink analog beamforming.

In some examples of the method, apparatus, and non-transitory computer-readable medium described above, the reference signal configuration includes a first timing offset for a first component carrier and a second timing offset for a second component carrier. In some examples of the method, apparatus, and non-transitory computer-readable medium described above, the first component carrier and the second component carrier operate in different radio frequency spectrum bands.

DETAILED DESCRIPTION

Some wireless communications may benefit from, or rely on, estimates of channel conditions between communicating devices. By way of example, a base station may schedule resources for various UEs based on frequency-dependent information associated with each UE. Such frequency-dependent information (as well as other CSI) may be determined based at least in part on a channel sounding procedure. Channel sounding may refer to operations in which a UE transmits an SRS, which is used by a base station for channel estimation. For example, a base station (or some other network access device) may configure a UE with a reference signal configuration. By way of example, the reference signal configuration may include an indication of one or more use cases for the reference signal, including uplink CSI acquisition, uplink non-codebook-based precoding, downlink CSI acquisition, uplink analog beamforming, combinations thereof, etc. The timing required for the UE to perform the channel sounding procedure may be based at least in part on the use case indicated by the reference signal configuration. Techniques are described herein by which a UE (e.g., and a base station) may identify a transmission opportunity (e.g., or a plurality of transmission opportunities) based at least in part on the reference signal configuration. Such techniques may provide multiple benefits to a wireless system including reduced access latency, decreased transmission interference, efficient use of a system bandwidth, etc.

Aspects of the disclosure are initially described in the context of a wireless communications system. Aspects of the disclosure are then illustrated by and described with reference to timing diagrams and process flows. Aspects of the disclosure are further illustrated by and described with reference to apparatus diagrams, system diagrams, and flowcharts that relate to reference signal transmission window and timing considerations.

Figure 1:
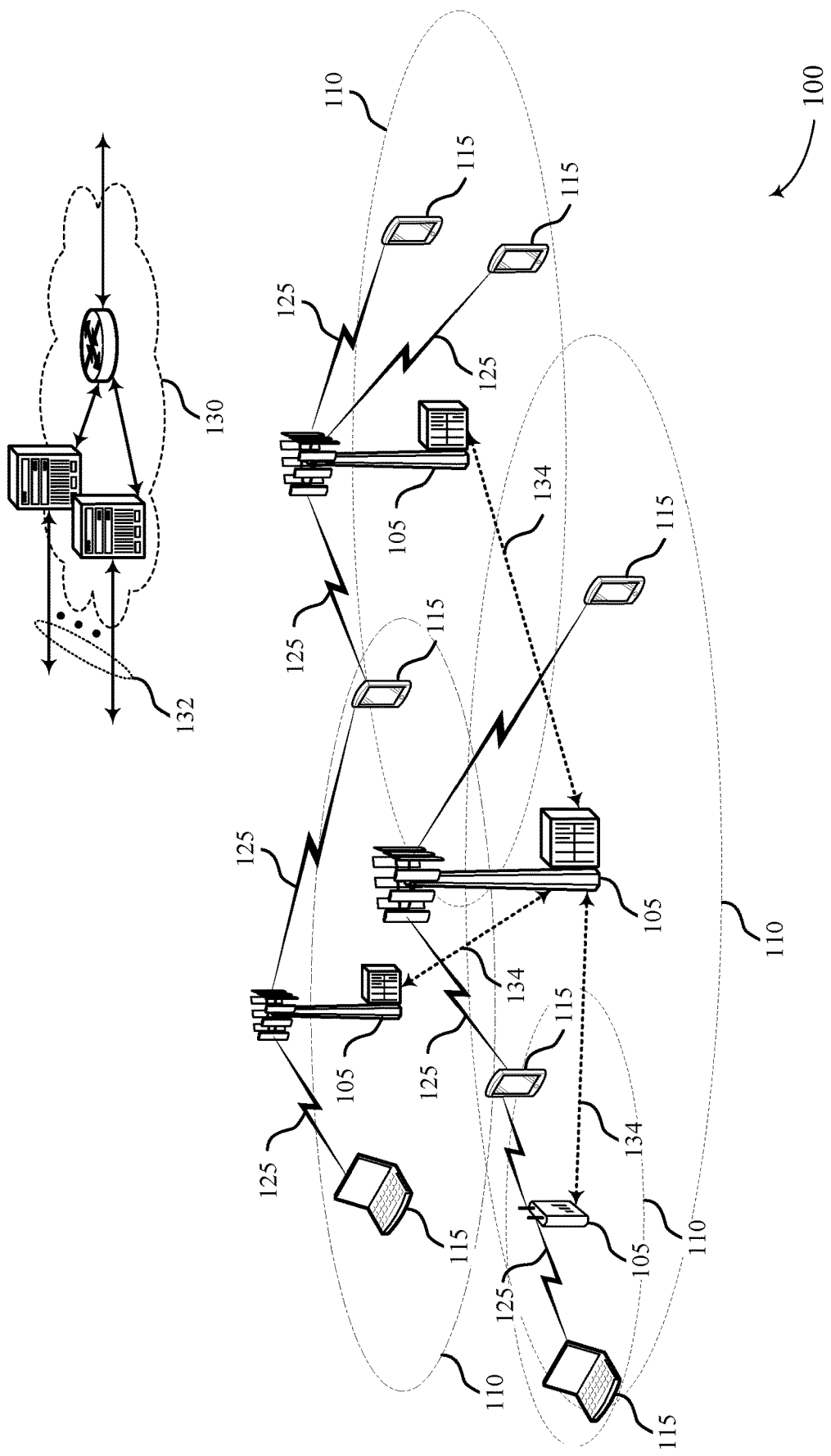
FIG. 1 illustrates an example of a system for wireless communication that supports reference signal transmission window and timing considerations in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, precoding, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications systems such as an NR system may support communications over bandwidth parts (BWPs). For example, one or multiple BWPs may be configured for each CC, and these BWPs may be signaled (e.g., semi-statically) to a UE 115. A BWP may contain a group of contiguous (in frequency) physical resource blocks (PRBs). Each BWP may be associated with a specific numerology (e.g., sub-carrier spacing, cyclic prefix type, etc.). Additionally or alternatively, reserved resources may be configured within the BWP. By way of example, the bandwidth of a BWP may be greater than (or equal to) the bandwidth of a synchronization signal (SS) block supported by the system but less than (or equal to) the maximum bandwidth capability supported by the UE 115. A BWP may or may not contain an SS block. In some cases, configuration of a BWP (e.g., for an RRC CONNECTED UE 115) may include one or more of a numerology, a frequency location (e.g., a center frequency of the BWP), a bandwidth of the BWP (e.g., a number of PRBs), among other properties. A UE 115 may expect at least one downlink BWP and one uplink BWP to be active among the set of configured BWPs for a given time instant. The active downlink (or uplink) BWP is assumed not to span a frequency range larger than the downlink (or uplink) bandwidth capability of the UE 115 in a given CC.

Some of the operations described above (e.g., MIMO communications, resource scheduling, etc.) may benefit from or rely on channel sounding procedures by which a base station 105 obtains estimates of the channel between itself and various UEs 115. For example, an NR system may support SRS resources that span one, two, or four adjacent symbols with up to four antenna ports per SRS resource (e.g., where all ports of an SRS resource are sounded in each of the adjacent symbols). The SRS resource may be scheduled in time aperiodically (e.g., based on downlink control information (DCI) signaling), semi-persistently, periodically, or some combination thereof. The SRS transmission may be wideband (e.g., across a system bandwidth) or sub-band-specific. In some cases, the SRS bandwidth may be a multiple of four PRBs (e.g., four PRBs, eight PRBs, 12 PRBs, etc.).

An NR system may support switching between partial bands for SRS transmissions in a CC (e.g., when a UE 115 is not capable of simultaneous transmission in partial bands or BWPs of a given CC). A UE 115 may be configured with multiple sets of SRS resources, which SRS resources may be grouped depending on the use case (e.g., uplink CSI acquisition, uplink non-codebook-based precoding, downlink CSI acquisition, uplink analog beamforming, combinations thereof, etc.). As described above, an NR system may support SRS transmission where the numerology (or numerologies) of the SRS resources may be configurable for a given UE 115. Additionally or alternatively, SRS antenna switching within a carrier (e.g., a CC) may be supported.

In an LTE system, SRS may be confined to being transmitted in the last symbol of a subframe. Aperiodic SRS triggering and SRS transmission may be performed with a four (or more) subframe delay. That is, a UE 115 may perform SRS transmission at least four subframes after SRS triggering. In some cases (e.g., in multi-carrier scenarios supporting SRS switching across CCs), the UE 115 may be aware of a slot-based grid in which it is allowed to transmit after receiving the SRS triggering. For example, the slot-based grid may be based on an equation which indicates a subframe (after the requisite four subframe delay) in which the UE 115 may transmit SRS. This equation may serve to stagger SRS transmissions from various UEs 115 in time (e.g., which may reduce interference between SRS from different UEs 115).

Alternatively, in an NR system SRS may be transmitted in the last six symbols of a slot. As described above, an SRS resource may span one, two, or four adjacent symbols (e.g., compared to only one symbol for an LTE SRS resource). Additionally or alternatively, intra-slot and inter-slot frequency hopping within a BWP of a CC, across BWPs of a CC, or across BWPs of different CCs may be supported. Because of the increased variability of SRS resources supported by an NR system, considerations for reference signal transmission window and timing may be beneficial. In some cases, these considerations may be based at least in part on the time a UE 115 needs to perform a given task (e.g., as described with reference to FIG. 3). Accordingly, wireless communications system 100 may support techniques by which a reference signal transmission window and timing are based at least in part on a capability of a UE 115, a use case for the reference signal, a type of grant triggering the reference signal, etc. Such techniques may benefit wireless communications system 100 in terms of access latency, interference diversity, etc.

Figure 2:
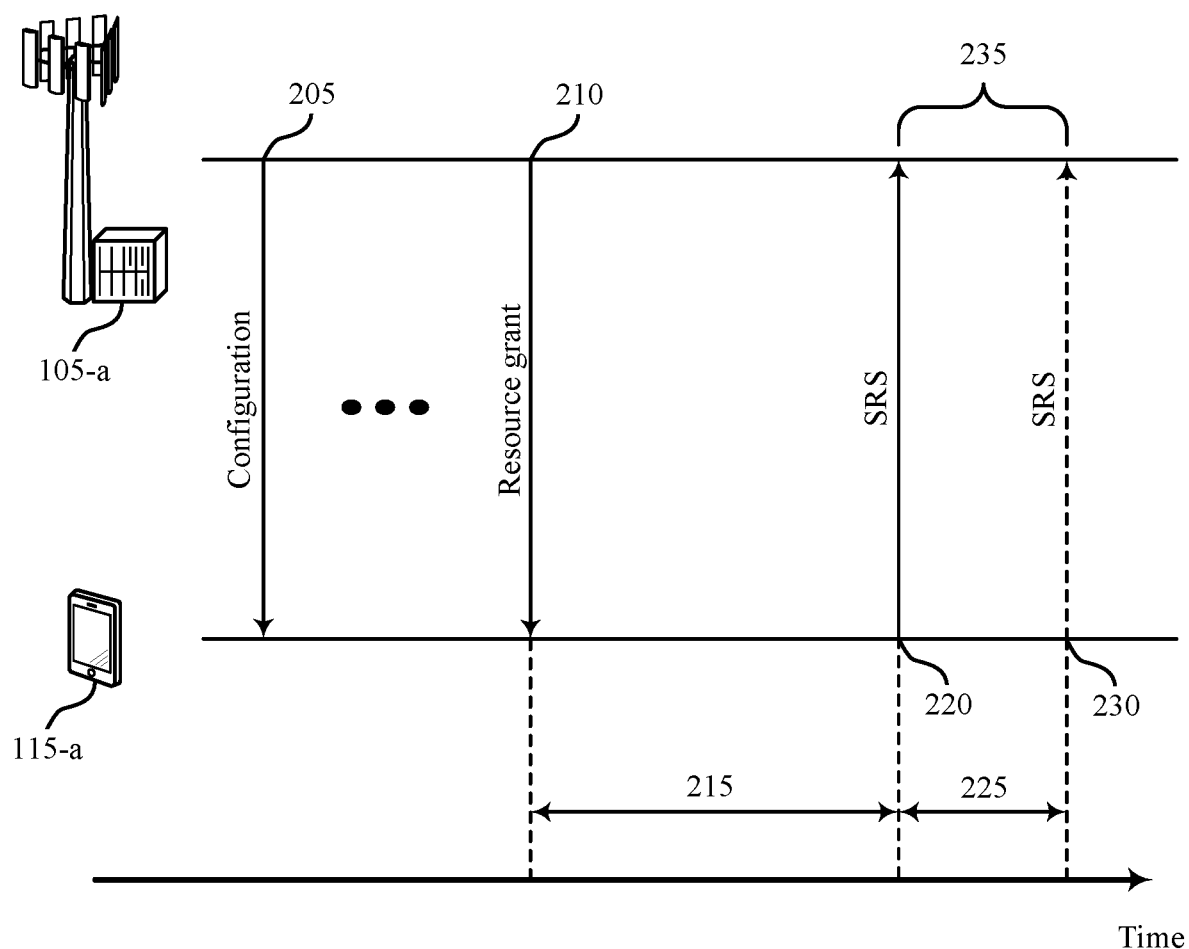
FIGS. 2 through 5 illustrate example timing diagrams that support reference signal transmission window and timing considerations in accordance with aspects of the present disclosure.

FIG. 2 illustrates an example of a timing diagram 200 that supports reference signal transmission window and timing considerations in accordance with various aspects of the present disclosure. In some examples, timing diagram 200 may implement aspects of wireless communications system 100. Timing diagram 200 includes base station 105-*a* and UE 115-*a*, each of which may be an example of the corresponding device described with reference to FIG. 1.

At 205, base station 105-*a* (e.g., or some other network device) may transmit a reference signal configuration to UE 115-*a*. For example, the reference signal configuration may be transmitted via RRC signaling (e.g., when UE 115-*a* is in RRC CONNECTED mode). The reference signal configuration may in some cases indicate a use case for an SRS. By way of example, the SRS may be used for data acknowledgement, CSI acquisition, etc.

At 210, base station 105-*a* may transmit (and UE 115-*a* may receive) a resource grant triggering a resource grant configuration. For example, the resource grant may be carried on a physical downlink control channel (PDCCH) in the form of an aperiodic DCI transmission. In some examples, the resource grant may be an uplink grant (e.g., may allocate resources for a physical uplink shared channel (PUSCH) or physical uplink control channel (PUCCH) transmission from UE 115-*a* to base station 105-*a*). Additionally or alternatively, the resource grant may be a downlink grant (e.g., may allocate resources for a physical downlink shared channel (PDSCH) transmission from base station 105-*a* to UE 115-*a*). The resource grant may thus indicate one or more resource sets, and these resource sets may in some cases be grouped depending on a use case (e.g., CSI acquisition, data acknowledgement, precoding, etc.). In some examples, the allocated resources may be in the form of BWPs across one or more (e.g., one, two, four, etc.) adjacent symbol periods. The resource grant may convey additional information without deviating from the scope of the present disclosure.

Based on the resource grant at 210, UE 115-*a* may in some cases transmit an SRS at 220 (e.g., after a timing offset 215 has elapsed). In some examples, a duration of timing offset 215 may be based on a use case indicated by the resource grant or a processing capability of UE 115-*a* (e.g., as described with reference to FIGS. 3A, 3B, and 3C). For example, timing offset 215 may be different for an aperiodic SRS triggered from a downlink grant compared to an aperiodic SRS triggered from an uplink grant (e.g., as described with reference to FIG. 4).

In some cases, UE 115-*a* (e.g., and base station 105-*a*) may identify a transmission opportunity window 235 including a plurality of transmission opportunities. For example, the transmission opportunities may be separated in time by a periodicity 225. Accordingly, UE 115-*a* may attempt to transmit SRS at 220 and (in cases in which the SRS is unsuccessful) may attempt to transmit SRS at 230. In some cases, the SRS transmissions at 220 and 230 may be attempted over the same BWP(s) or different BWP(s) within the same CC or different CCs. Additional considerations for transmission opportunity window 235 are described with reference to FIG. 5.

Figure 3A:
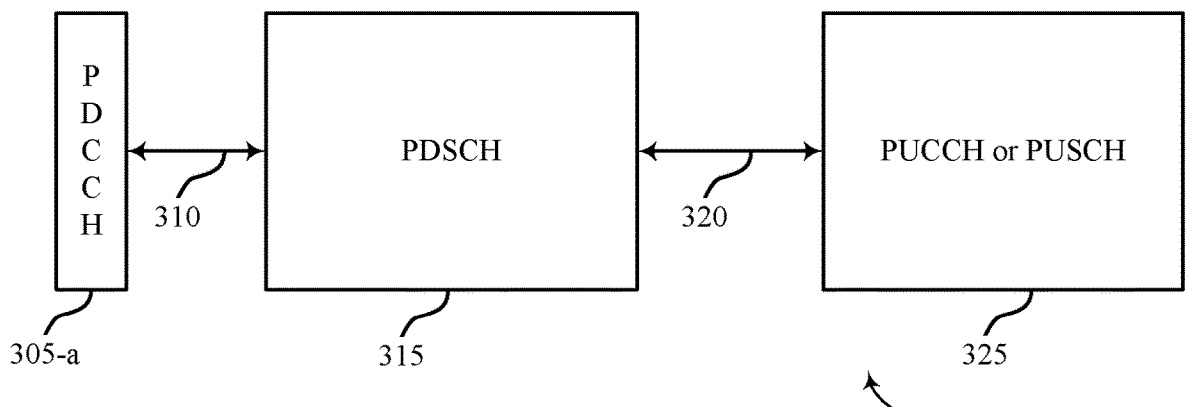

FIG. 3A illustrates an example of a timing diagram 300-*a* that supports reference signal transmission window and timing considerations in accordance with various aspects of the present disclosure. In some examples, timing diagram 300-*a* may illustrate aspects of wireless communications system 100. For example, timing diagram 300-*a* may illustrate aspects of operation of a UE 115 as described with reference to FIG. 1.

Timing diagram 300-*a* may be an example of a timing parameter in an NR system which is used to indicate the time a UE 115 needs to perform a task. In some cases, the UE 115 may indicate aspects of timing diagram 300-*a* to a base station 105 (e.g., via RRC signaling). As illustrated, timing diagram 300-*a* includes a PDCCH transmission 305-*a* (e.g., which may include a resource grant in the form of a DCI transmission, as described with reference to the resource grant transmitted at 210 in FIG. 2). A UE 115 receiving PDCCH transmission 305-*a* may require a delay 310 to receive and decode a downlink grant contained in PDCCH transmission 305-*a* before it starts receiving downlink data in the form of PDSCH transmission 315. That is, the UE 115 may need some time (indicated by delay 310) to change a radio frequency (RF) analog beam from the beam used to receive PDCCH transmission 305-a to the beam used to receive PDSCH transmission 315. Delay 310 may be measured in symbols (e.g., $N_0$ symbols), slots (e.g., $K_0$ slots), portions or combinations thereof, etc.

Similarly, the UE 115 may require a delay 320 between the last symbol of PDSCH transmission 315 and the first symbol of PUCCH or PUSCH transmission 325. For example, PUCCH or PUSCH transmission 325 may carry acknowledgement information for PDSCH transmission 315, which acknowledgement information may be prepared during delay 320. Delay 320 may be measured in symbols (e.g., $N_1$ symbols), slots (e.g., $K_1$ slots), portions or combinations thereof, etc.

Figure 3B:
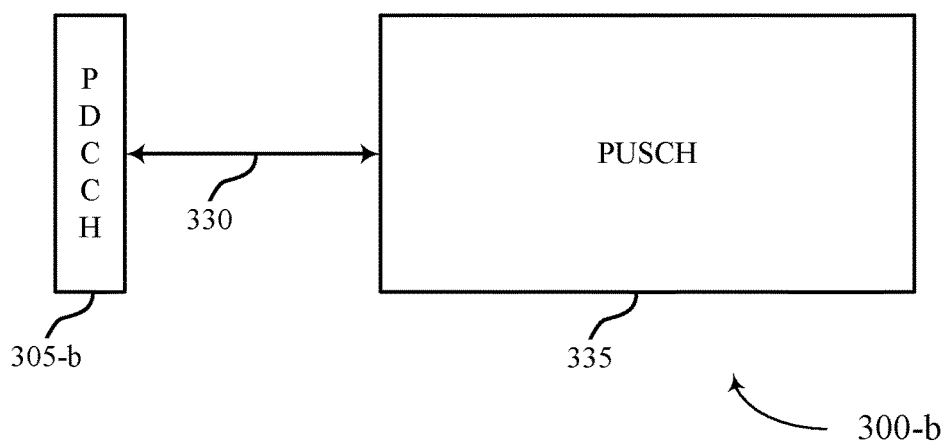

FIG. 3B illustrates an example of a timing diagram 300-b that supports reference signal transmission window and timing considerations in accordance with various aspects of the present disclosure. In some examples, timing diagram 300-b may illustrate aspects of wireless communications system 100. For example, timing diagram 300-b may illustrate aspects of operation of a UE 115 as described with reference to FIG. 1.

Timing diagram 300-b may be an example of a timing parameter in an NR system which is used to indicate the time a UE 115 needs to perform a task. In some cases, the UE 115 may indicate aspects of timing diagram 300-b to a base station 105 (e.g., via RRC signaling). As illustrated, timing diagram 300-b includes a PDCCH transmission 305-b (e.g., which may include a resource grant in the form of a DCI transmission, as described with reference to the resource grant transmitted at 210 in FIG. 2). A UE 115 receiving PDCCH transmission 305-b may require delay 330 to receive and decode an uplink grant contained in PDCCH transmission 305-b before it starts transmitting uplink data in the form of PUSCH transmission 335. Delay 330 may be measured in symbols (e.g., $N_2$ symbols), slots (e.g., $K_2$ slots), portions or combinations thereof, etc.

Figure 3C:
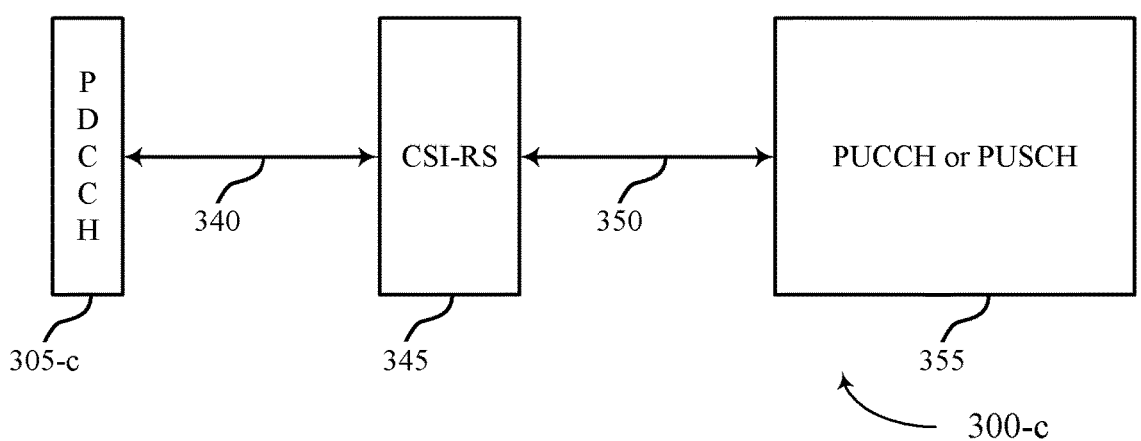

FIG. 3C illustrates an example of a timing diagram 300-c that supports reference signal transmission window and timing considerations in accordance with various aspects of the present disclosure. In some examples, timing diagram 300-c may illustrate aspects of wireless communications system 100. For example, timing diagram 300-c may illustrate aspects of operation of a UE 115 as described with reference to FIG. 1.

Timing diagram 300-c may be an example of a timing parameter in an NR system which is used to indicate the time a UE 115 needs to perform a task. In some cases, the UE 115 may indicate aspects of timing diagram 300-c to a base station 105 (e.g., via RRC signaling). As illustrated, timing diagram 300-c includes a PDCCH transmission 305-c (e.g., which may include a resource grant in the form of a DCI transmission, as described with reference to the resource grant transmitted at 210 in FIG. 2). A UE 115 receiving PDCCH transmission 305-c may require delay 340 to receive and decode a downlink grant contained in PDCCH transmission 305-c before it starts receiving reference signal information in the form of CSI-RS transmission 345. That is, the UE 115 may need some time (indicated by delay 340) to change a radio frequency (RF) analog beam from the beam used to receive PDCCH transmission 305-c to the beam used to receive CSI-RS transmission 345. Delay 340 may be measured in symbols (e.g., $N_4$ symbols), slots (e.g., $K_4$ slots), portions or combinations thereof, etc.

Similarly, the UE 115 may require delay 350 between the last symbol of CSI-RS transmission 345 and the first symbol of PUCCH or PUSCH transmission 355. For example, PUCCH or PUSCH transmission 355 may carry channel state feedback (CSF) information for CSI-RS transmission 345, which CSF information may be prepared during delay 350. That is, UE 115 may use delay 350 to perform channel estimation measurement based on CSI-RS transmission 345 and prepare the CSF information to be transmitted in PUCCH or PUSCH transmission 355. Delay 350 may be measured in symbols (e.g., $N_3$ symbols), slots (e.g., $K_3$ slots), portions or combinations thereof, etc.

Accordingly, a UE 115 may indicate processing capabilities associated with delays 310, 320, 330, 340, and 350 to a base station 105. These processing capabilities may inform a timing offset between a DCI resource grant and subsequent SRS transmission, as described further below. It is to be understood that delays 310, 320, 330, 340, and 350 are illustrated for the sake of explanation and the size of the respective delays may not be correlated to the size of the arrows illustrated in FIGS. 3A, 3B, and 3C. Additionally, the duration of any of delays 310, 320, 330, 340, and 350 may be based on one or more other factors. For example, in the case of delay 320, the duration may be extended (e.g., by a number of symbol periods, a number of slots, etc.) depending on whether the acknowledgement information is to be multiplexed with some other uplink channels or information. Similarly, delay 350 may be extended if the CSF information is multiplexed with acknowledgement information. These examples are provided for the sake of explanation and are not limiting of scope; other factors may contribute to the duration of the respective delays 310, 320, 330, 340, and 350.

Figure 4:
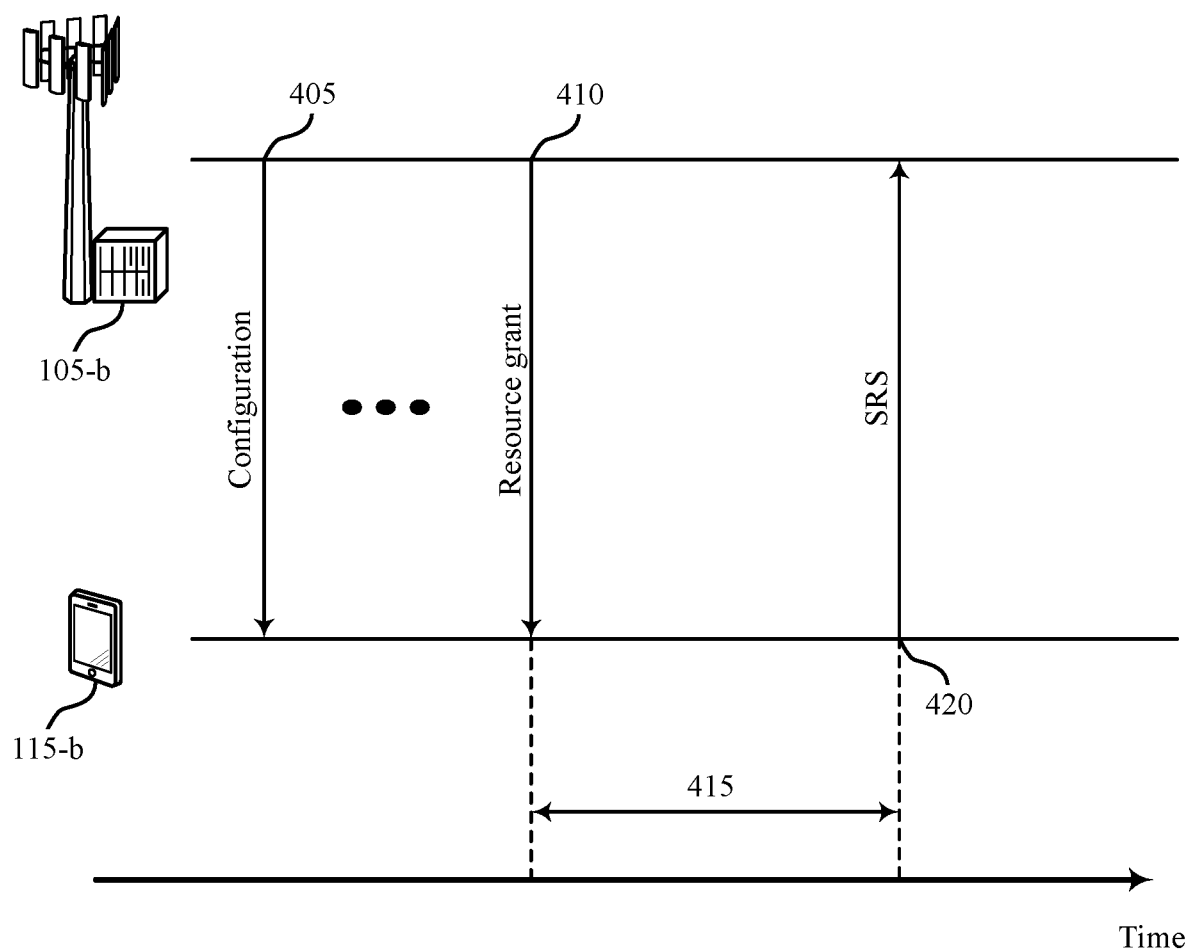

FIG. 4 illustrates an example of a timing diagram 400 that supports reference signal transmission window and timing considerations in accordance with various aspects of the present disclosure. In some examples, timing diagram 400 may implement aspects of wireless communications system 100. Timing diagram 400 includes base station 105-b and UE 115-b, each of which may be an example of the corresponding device described with reference to FIG. 1.

At 405, base station 105-b (e.g., or some other network device) may transmit a reference signal configuration to UE 115-b. For example, the reference signal configuration may be transmitted via RRC signaling. The reference signal configuration may in some cases indicate a use case for an SRS. By way of example, the SRS may be used for data acknowledgement, CSI acquisition, etc.

At 410, base station 105-b may transmit (and UE 115-b may receive) a resource grant triggering the resource grant configuration. For example, the resource grant may be carried in the form of a DCI transmission. In some examples, the resource grant may be an uplink grant or may be a downlink grant. The resource grant may thus indicate one or more resource sets, and these resource sets may in some cases be grouped depending on a use case (e.g., CSI acquisition, data acknowledgement, precoding, etc.). In some examples, the allocated resources may be in the form of BWPs across one or more (e.g., one, two, four, etc.) adjacent symbol periods. The resource grant may convey additional information without deviating from the scope of the present disclosure.

Based on the resource grant at 410, UE 115-b may in some cases transmit an SRS at 420 (e.g., after a timing offset 415 has elapsed). In some examples, a duration of timing offset 415 may be based on a use case indicated by the resource grant or a processing capability of UE 115-b. For example, timing offset 415 may be different for an aperiodic SRS triggered from a downlink grant compared to an aperiodic SRS triggered from an uplink grant. Specifically, for an aperiodic SRS for uplink CSI acquisition which is not associated with an aperiodic downlink CSI-RS transmission, the only constraint on timing of the SRS transmission at 420 may be the time needed by UE 115-*b* to decode the DCI (i.e., delay 310 as described with reference to FIG. 3A for an SRS triggered in a downlink grant and delay 330 as described with reference to FIG. 3B for an SRS triggered in an uplink grant). In some cases (e.g., for an SRS triggered in an uplink grant that is not associated with an aperiodic downlink CSI-RS transmission), UE 115-*b* may transmit SRS earlier than the timing indicated by delay 330 (e.g., because it may not need to prepare a data package).

Alternatively, for uplink CSI acquisition that is associated with an aperiodic downlink CSI-RS transmission, the constraints on the timing of the SRS transmission at 420 may include the time UE 115-*b* requires to decode the DCI as well as the time required to receive the CSI-RS transmission (e.g., as described with reference to FIG. 3C). UE 115-*b* may use the CSI-RS transmission to pick a suitable precoder to transmit the SRS transmission at 420. Selecting the suitable precoder may be associated with a timing offset (e.g., delay 350 as described with reference to FIG. 3C or a related delay). In such cases, timing offset 415 may span a duration of delay 340 and delay 350 after the PDCCH that triggers the joint aperiodic CSI-RS and SRS transmissions. In some cases, the timing needed after CSI-RS transmission and before being able to compute the precoder of the SRS may be based on whether the precoding is based on a codebook or non-codebook-based precoding scheme.

Similarly, for downlink CSI acquisition that is not associated with an aperiodic downlink CSI-RS transmission, the only constraint on the timing of the SRS transmission at 420 may be the time needed by UE 115-*b* to decode the downlink or uplink grant and transmit the SRS (e.g., as indicated by delay 310 and delay 330, respectively). If the downlink CSI acquisition is associated with an aperiodic downlink CSI-RS transmission, an additional constraint on the timing of the SRS transmission at 420 may be based on the time required by UE 115-*b* to receive the CSI-RS and pick a suitable precoder for the SRS transmission.

In the examples described above, additional constraints on the timing of the SRS transmission at 420 may be based on whether the SRS is used to modulate data (e.g., acknowledgement information). For example, if the SRS transmission is jointly triggered with the corresponding data, the SRS may not be transmitted at 420 earlier than the time required to decode the data (e.g., delay 310 to decode the DCI and delay 320 to decode the data and prepare the acknowledgement information. Similarly, if the SRS transmission at 420 is multiplexed with some additional channel (e.g., PUSCH or PUCCH) within a given symbol or set of symbols, timing offset 415 may increase further (e.g., because of the dependency of the SRS transmission on the PUCCH or PUSCH timing).

Thus, the duration of timing offset 415 may be based on one or more factors including a type of SRS (e.g., downlink CSI acquisition, uplink CSI acquisition, the presence of a CSI-RS transmission, whether the SRS is to be multiplexed with data, etc.) and/or a processing capability of UE 115-*b* (e.g., which may be indicated to base station 105-*b* in the form of RRC signaling as discussed above).

Figure 5:
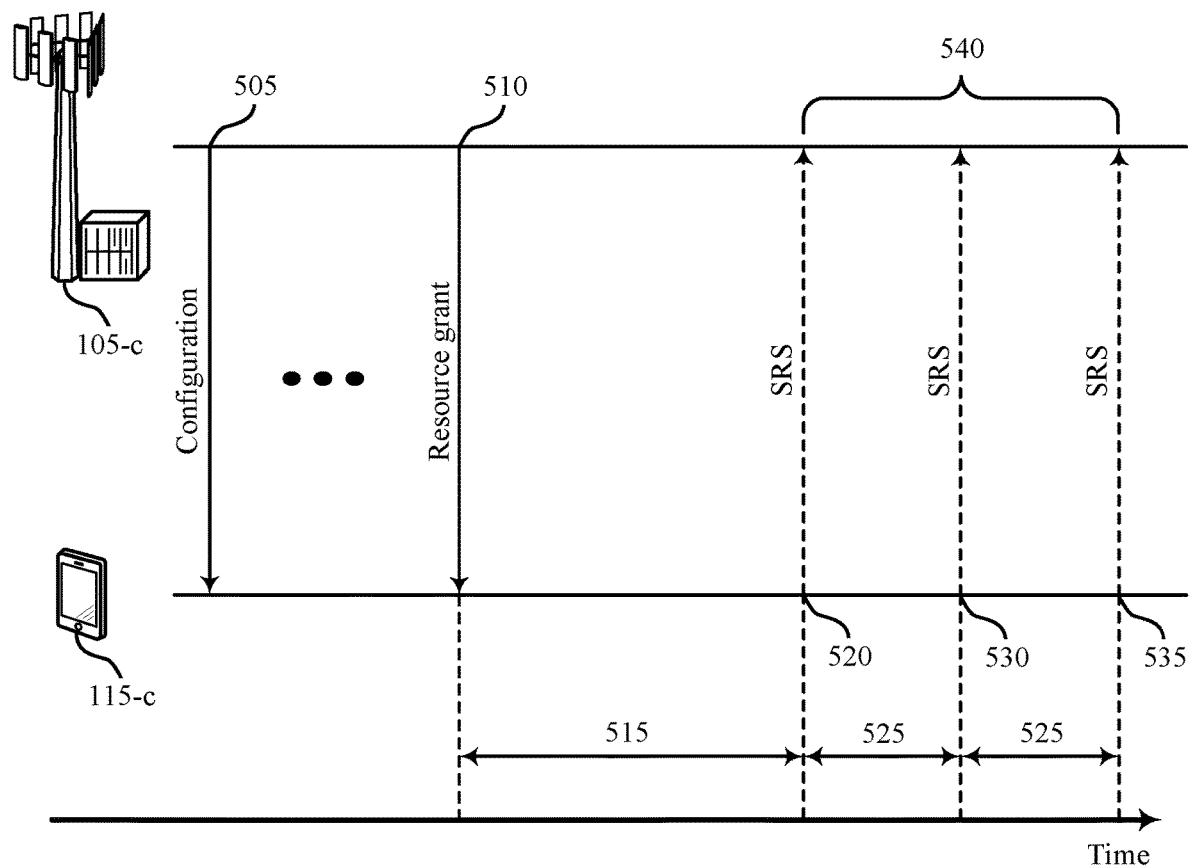

FIG. 5 illustrates an example of a timing diagram 500 that supports reference signal transmission window and timing considerations in accordance with various aspects of the present disclosure. In some examples, timing diagram 500 may implement aspects of wireless communications system 100. Timing diagram 500 includes base station 105-*c* and UE 115-*c*, each of which may be an example of the corresponding device described with reference to FIG. 1. Aspects of timing diagram 400 and timing diagram 500 may be combined.

At 505, base station 105-*c* (e.g., or some other network device) may transmit a reference signal configuration to UE 115-*c*. For example, the reference signal configuration may be transmitted via RRC signaling. The reference signal configuration may in some cases indicate a use case for an SRS. By way of example, the SRS may be used for data acknowledgement, CSI acquisition, etc.

At 510, base station 105-*c* may transmit (and UE 115-*c* may receive) a resource grant triggering the resource grant configuration. For example, the resource grant may be carried in the form of a DCI transmission. In some examples, the resource grant may be an uplink grant or may be a downlink grant. The resource grant may thus indicate one or more resource sets, and these resource sets may in some cases be grouped depending on a use case (e.g., CSI acquisition, data acknowledgement, precoding, etc.). In some examples, the allocated resources may be in the form of BWPs across one or more (e.g., one, two, four, etc.) adjacent symbol periods. The resource grant may convey additional information without deviating from the scope of the present disclosure.

Based on the resource grant at 510, UE 115-*c* may in some cases identify a transmission opportunity window 540 after a timing offset 515 (e.g., which may be an example of timing offset 415 described with reference to FIG. 4) has elapsed. For example, transmission opportunity window 540 may include a plurality of transmission opportunities. Transmission opportunity window 540 is illustrated as containing three transmission opportunities, though any suitable number of transmission opportunities may be contained within transmission opportunity window 540 without deviating from the scope of the present disclosure. For example, the transmission opportunities may be separated in time by a periodicity 525. Accordingly, UE 115-*c* may attempt to transmit SRS at 520 and (in cases in which the SRS is unsuccessful) may attempt to transmit SRS at 530, at 535, etc. In some cases, the SRS transmissions at 520, 530, and 535 may be attempted over the same BWP(s) or different BWP(s) within the same CC or different CCs. For example, for different CCs, SRS transmissions in a first CC may have a first timing offset 515 (e.g., at 520), which SRS transmissions in a second CC may have a second timing offset 515 plus a periodicity 525 (e.g., 530). As discussed herein, the wireless communications system may operate in different combinations of spectrum bands (e.g., licensed, share, and unlicensed spectrum bands), such that different CCs may operate in different spectrum bands. After timing offset 515 has elapsed, UE 115-*c* may attempt to transmit SRS at 520. However, for some reason the SRS transmission may be prevented (e.g., because of a dynamic TDD configuration which does not allow uplink transmission in a given symbol or set of symbols, because of RF switching due to changing BWPs or CCs, etc.).

Transmission opportunity window 540 may be defined in a number of slots, a number of symbols, or some combination thereof. UE 115-*c* may sequentially attempt to access transmission opportunities within transmission opportunity window 540 until a successful SRS transmission is performed. For example, if transmission opportunity window 540 includes three slots, UE 115-*c* may attempt to transmit SRS in the same symbol of each slot (e.g., at 520, 530, and 535) until SRS transmission is available. Similarly, if transmission opportunity window 540 includes three symbols, UE 115-*c* may attempt to transmit SRS in each successive symbol until SRS transmission is available. In some cases, transmission opportunity window 540 may be configurable semi-statically (e.g., based on signaling transmitted to UE 115-*c*). Additionally or alternatively, a size of transmission opportunity window may dynamically depend on the SRS resource purpose (e.g., downlink CSI acquisition, uplink CSI acquisition, etc.).

Thus, UE 115-*c* may be configured to perform a series of SRS transmission after timing offset 515 has elapsed. In some cases, the behavior of UE 115-*c* may be deterministically configured throughout the transmission opportunity window 540. For example, UE 115-*c* may transmit multiple SRS across multiple BWPs of a single CC (e.g., or across multiple BWPs of multiple CCs). UE 115-*c* may be triggered for a series of transmissions in the same symbol across three (or some other suitable number) of slots. If that symbol is not available for SRS transmission, then based on transmission opportunity window 540, UE 115-*c* may attempt transmission at the next available transmission opportunity or may drop transmission upon expiration of transmission opportunity window 540 without a successful SRS transmission. In some cases, transmission opportunity window 540 may be applicable for periodic, semi-persistent, or aperiodic SRS transmissions.

In some cases, transmission opportunity window 540 may be configured even if there is a specific slot-based grid configured for SRS transmission (e.g., similar to the operation of the LTE system described above). For example, UE 115-*c* may be triggered to perform one symbol SRS transmission across four carriers, but may only be allowed to transmit in every fourth slot on the twelfth symbol. Nominally, such a configuration may require a fifteen slots to ensure an available transmission opportunity. However, if the SRS is dropped in a given slot (e.g., because of collision with a downlink symbol, collision with another uplink channel with a higher priority, etc.), UE 115-*c* may (based on transmission opportunity window 540) attempt to transmit SRS in that CC in the next allowable transmission opportunity (e.g., the next slot or next symbol within transmission opportunity window 540).

Figure 6:
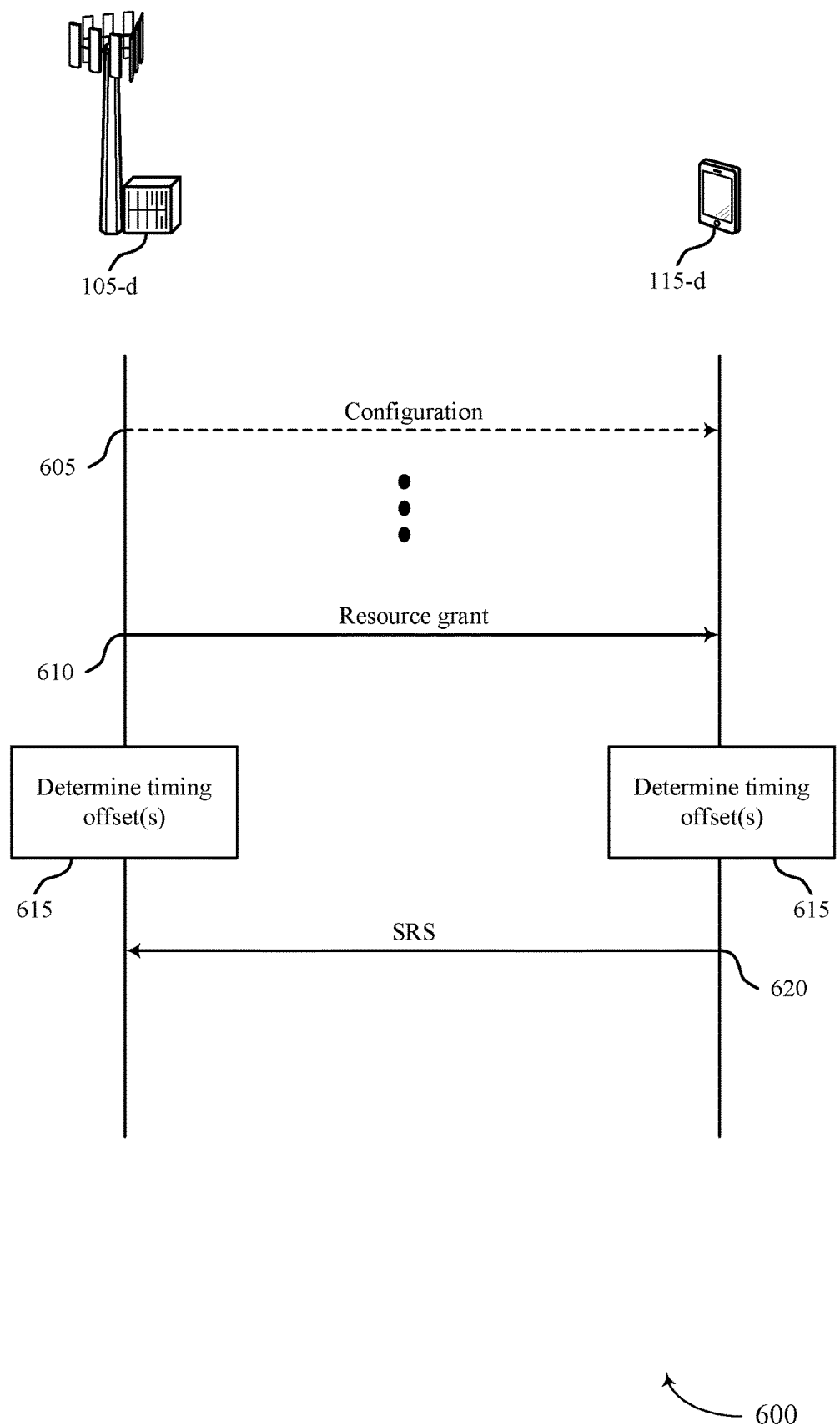
FIG. 6 illustrates an example of a process flow that supports reference signal transmission window and timing considerations in accordance with aspects of the present disclosure.

FIG. 6 illustrates an example of a process flow 600 that supports reference signal transmission window and timing considerations in accordance with various aspects of the present disclosure. In some examples, process flow 600 may implement aspects of wireless communications system 100. Process flow 600 includes base station 105-*d* and UE 115-*d*, each of which may be an example of the corresponding device described with reference to FIG. 1.

At 605, base station 105-*d* (or some other network entity) may transmit a reference signal configuration to UE 115-*d*. For example, the reference signal configuration may indicate a type of SRS to be transmitted by UE 115-*d*. The reference signal configuration may be included in a control transmission (e.g., which may include RRC signaling or other control signaling available between base station 105-*d* and UE 115-*d*).

At 610, base station 105-*d* may transmit (and UE 115-*d* may receive) a resource grant triggering the reference signal configuration. For example, the resource grant may be included in a DCI transmission. The resource grant may be a downlink resource grant, an uplink resource grant, or some combination thereof.

At 615, UE 115-*d* (and base station 105-*d*) may determine a timing offset relative to the resource grant based at least in part on the reference signal configuration. For example, the timing offset may be based on (e.g., or provide timing sufficient to receive) a CSI-RS and identify a precoder for an SRS based on the CSI-RS. Additionally or alternatively, the timing offset may be based on (or provide timing sufficient to receive) a data transmission and modulate the SRS based on the data transmission. In some cases, the timing offset may be based on a processing capability of UE 115-*d* (which processing capability may be indicated to base station 105-*d*). In some examples, determining the timing offset includes identifying a transmission opportunity window including a plurality of transmission opportunities. For example, the transmission opportunities may be separated in time by a given periodicity, and the transmission opportunity window may be associated with a given duration. By way of example, the periodicity of the transmission opportunities or the duration of the transmission opportunity window may include a number of symbols, a number of slots, or some combination thereof. In some cases, the transmission opportunities may be associated with a same BWP (or set of BWPs), or each transmission opportunity may be associated with a respective BWP.

At 620, UE 115-*d* may transmit an SRS based at least in part on the timing offset. In some cases, UE 115-*d* may sequentially attempt to transmit the SRS at transmission opportunities of the transmission opportunity window until an SRS transmission is available.

Figure 7:
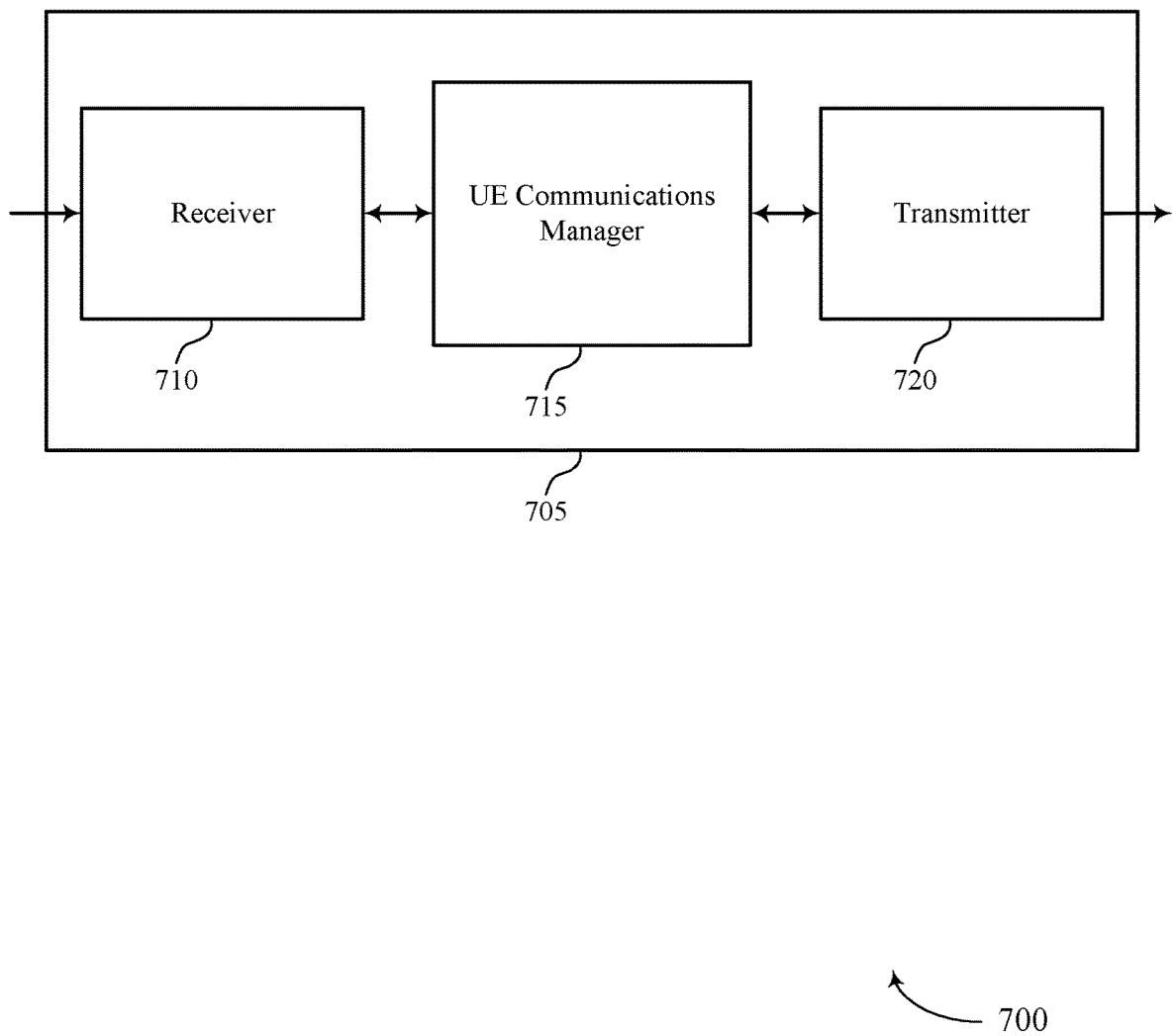
FIGS. 7 and 8 show block diagrams of a device that supports reference signal transmission window and timing considerations in accordance with aspects of the present disclosure.

FIG. 7 shows a block diagram 700 of a wireless device 705 that supports reference signal transmission window and timing considerations in accordance with aspects of the present disclosure. Wireless device 705 may be an example of aspects of a UE 115 as described herein. Wireless device 705 may include receiver 710, UE communications manager 715, and transmitter 720. Wireless device 705 may also include one or more processors, memory coupled with the one or more processors, and instructions stored in the memory that are executable by the one or more processors to enable the one or more processors to perform the features discussed herein. Each of these components may be in communication with one another (e.g., via one or more buses).

Receiver 710 may receive information such as packets, user data, or control information associated with various information channels (e.g., control channels, data channels, and information related to reference signal transmission window and timing considerations, etc.). Information may be passed on to other components of the wireless device 705. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive, from a base station 105, a resource grant triggering a reference signal configuration. UE communications manager 715 may determine a timing offset relative to the resource grant based on the reference signal configuration. UE communications manager 715 may transmit a reference signal based on the timing offset. In some cases, the reference signal configuration may include an indication of a use case for the reference signal, and the indicated use case may include an uplink channel state information acquisition, or a downlink channel state information acquisition, or an uplink non-codebook-based precoding, or an uplink codebook-based precoding, or an uplink analog beamforming. In some cases, the reference signal configuration may include a first timing offset for a first component carrier and a second timing offset for a second component carrier, and the first component carrier and the second component carrier operate in different radio frequency spectrum bands. In some cases, the reference signal may include a sounding reference signal.

Transmitter 720 may transmit signals generated by other components of the wireless device 705. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
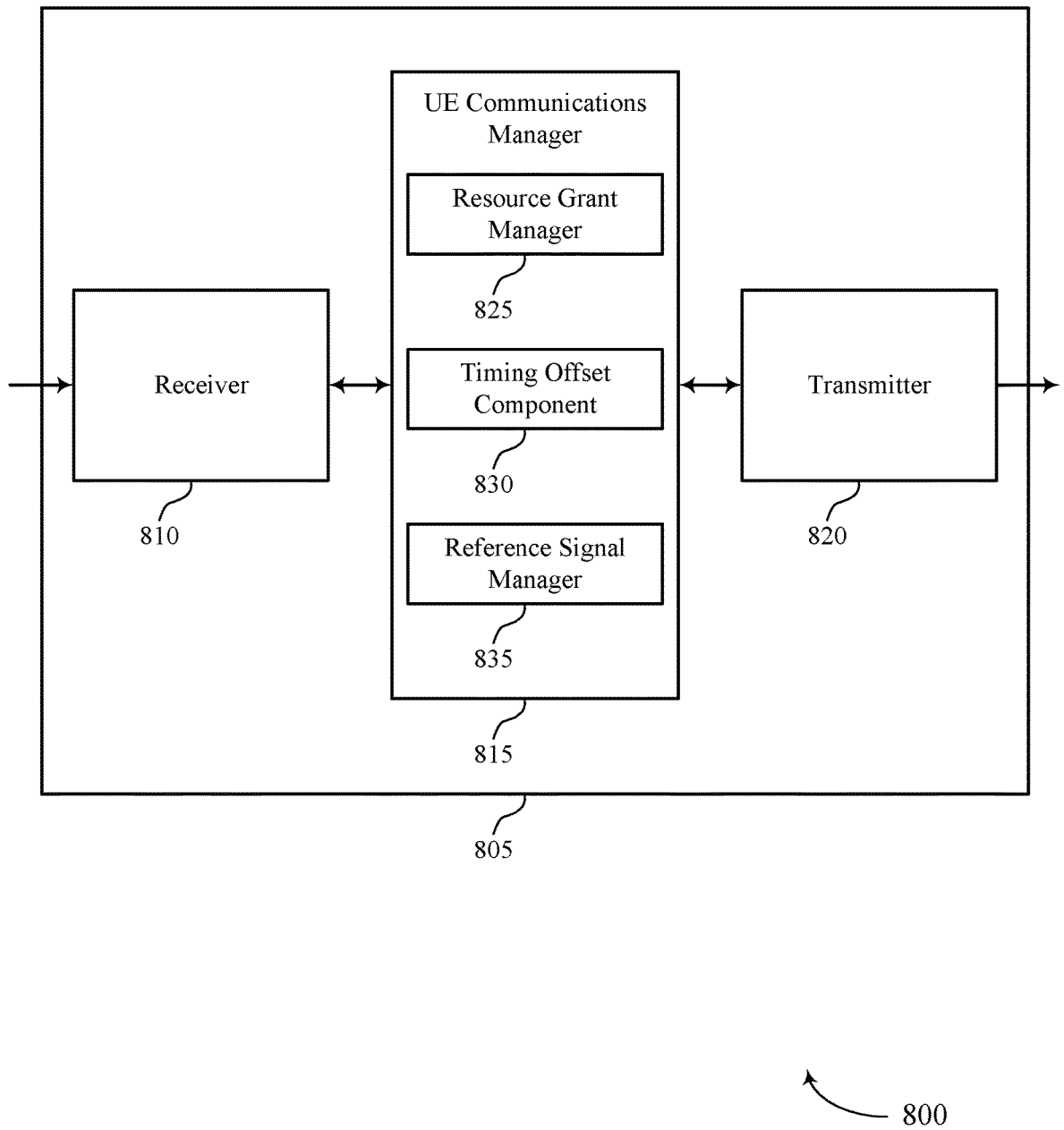

FIG. 8 shows a block diagram 800 of a wireless device 805 that supports reference signal transmission window and timing considerations in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to reference signal transmission window and timing considerations, etc.). Information may be passed on to other components of the wireless device 805. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include resource grant manager 825, timing offset component 830, and reference signal manager 835. In some cases, UE communications manager 815 may be a processor (e.g., a transceiver processor, or a radio processor, or a receiver processor. The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the wireless device 805. A radio processor may be collocated with and/or communicate with (e.g., direct the operations of) a radio (e.g., an LTE radio or a Wi-Fi radio) of the wireless device 805. A receiver processor may be collocated with and/or communicate with (e.g., direct the operations of) a receiver of the wireless device 805.

Resource grant manager 825 may receive a reference signal configuration in a control transmission that precedes a resource grant. For example, the reference signal configuration may be received via RRC signaling. In some cases, the reference signal configuration may include an indication of a use case for the reference signal, and the indicated use case may include an uplink channel state information acquisition, or a downlink channel state information acquisition, or an uplink non-codebook-based precoding, or an uplink codebook-based precoding, or an uplink analog beamforming. In some cases, the reference signal configuration may include a first timing offset for a first component carrier and a second timing offset for a second component carrier, and the first component carrier and the second component carrier operate in different radio frequency spectrum bands. In some cases, the reference signal may include a sounding reference signal. Resource grant manager 825 may receive, from a base station 105, a resource grant triggering the reference signal configuration. In some cases, resource grant manager 825 may be a processor (e.g., a transceiver processor, or a radio processor, or a receiver processor). The processor may be coupled with memory and execute instructions stored in the memory that enable the processor to perform or facilitate the features discussed herein.

Timing offset component 830 may determine a timing offset relative to the resource grant based on the reference signal configuration. Timing offset component 830 may indicate the processing capability of the UE 115 to the base station 105. In some cases, the timing offset is based on the processing capability of the UE 115, a delay associated with the reference signal configuration, or a combination thereof. In some cases, a duration of the timing offset is based on a directionality of the resource grant, where the directionality of the resource grant indicates resources for a downlink or uplink transmission. In some cases, timing offset component 830 may be a processor (e.g., a transceiver processor, or a radio processor, or a receiver processor). The processor may be coupled with memory and execute instructions stored in the memory that enable the processor to perform or facilitate the features discussed herein.

Reference signal manager 835 may receive a CSI-RS based on the reference signal configuration. Reference signal manager 835 may identify a precoder for the reference signal based on the CSI-RS. Reference signal manager 835 may modulate the reference signal based on the data transmission. Reference signal manager 835 may transmit a reference signal based on the timing offset. In some cases, reference signal manager 835 may be a processor (e.g., a transceiver processor, or a radio processor, or a receiver processor). The processor may be coupled with memory and execute instructions stored in the memory that enable the processor to perform or facilitate the features discussed herein.

Transmitter 820 may transmit signals generated by other components of the wireless device 805. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
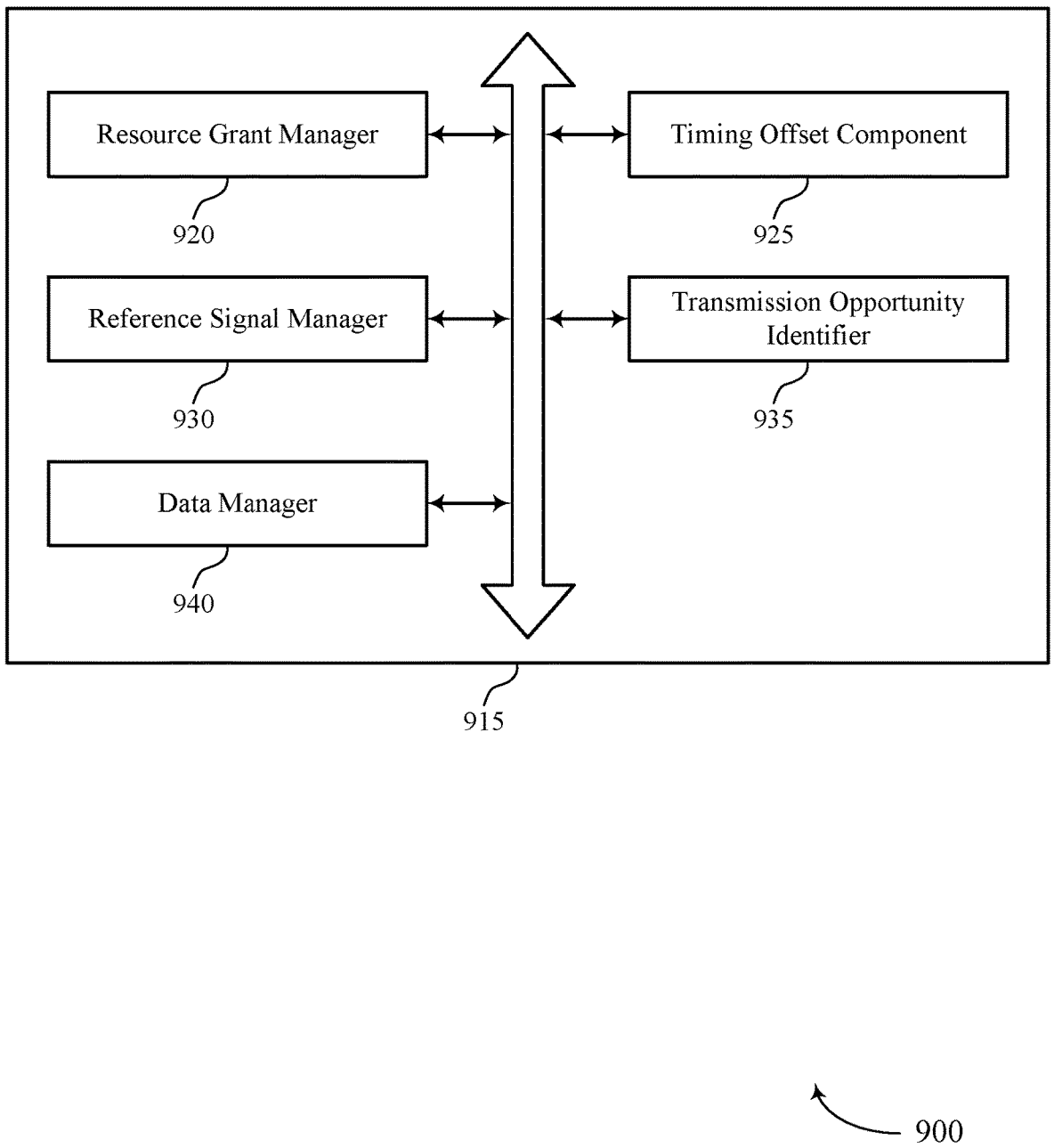
FIG. 9 shows a block diagrams of a UE communications manager that supports reference signal transmission window and timing considerations in accordance with aspects of the present disclosure.

FIG. 9 shows a block diagram 900 of a UE communications manager 915 that supports reference signal transmission window and timing considerations in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include resource grant manager 920, timing offset component 925, reference signal manager 930, transmission opportunity identifier 935, and data manager 940. Each of these modules may communicate, directly or indirectly, with one another (e.g., via one or more buses). In some cases, UE communications manager 915 may be a processor. (e.g., a transceiver processor, or a radio processor, or a receiver processor. The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

Resource grant manager 920 may receive a reference signal configuration in a control transmission that precedes a resource grant. Resource grant manager 920 may receive, from a base station 105, the resource grant triggering the reference signal configuration (i.e., triggering a reference signal transmission in accordance with the reference signal configuration). In some cases, the reference signal configuration may include an indication of a use case for the reference signal, and the indicated use case may include an uplink channel state information acquisition, or a downlink channel state information acquisition, or an uplink non-codebook-based precoding, or an uplink codebook-based precoding, or an uplink analog beamforming. In some cases, the reference signal configuration may include a first timing offset for a first component carrier and a second timing offset for a second component carrier, and the first component carrier and the second component carrier operate in different radio frequency spectrum bands. In some cases, the reference signal may include a sounding reference signal. In some cases, resource grant manager 920 may be a processor (e.g., a transceiver processor, or a radio processor, or a receiver processor). The processor may be coupled with memory and execute instructions stored in the memory that enable the processor to perform or facilitate the features discussed herein.

Timing offset component 925 may determine a timing offset relative to the resource grant based on the reference signal configuration. Timing offset component 925 may indicate a processing capability of the UE 115 to the base station 105. In some cases, the timing offset is based on the processing capability of the UE 115, a delay associated with the reference signal configuration, or a combination thereof. In some cases, a duration of the timing offset is based on a directionality of the resource grant, the directionality of the resource grant being downlink or uplink. In some cases, timing offset component 925 may be a processor (e.g., a transceiver processor, or a radio processor, or a receiver processor). The processor may be coupled with memory and execute instructions stored in the memory that enable the processor to perform or facilitate the features discussed herein.

Reference signal manager 930 may receive a CSI-RS based on the reference signal configuration. Reference signal manager 930 may identify a precoder for the reference signal based on the CSI-RS. Reference signal manager 930 may modulate the reference signal based on the data transmission. Reference signal manager 930 may transmit a reference signal based on the timing offset. In some cases, reference signal manager 930 may be a processor (e.g., a transceiver processor, or a radio processor, or a receiver processor). The processor may be coupled with memory and execute instructions stored in the memory that enable the processor to perform or facilitate the features discussed herein.

Transmission opportunity identifier 935 may identify a transmission opportunity window including a plurality of transmission opportunities based on the timing offset, where the reference signal is transmitted during a transmission opportunity of the plurality of transmission opportunities. Transmission opportunity identifier 935 determine a duration of the transmission opportunity window or a periodicity of the transmission opportunities based on the reference signal configuration. In some cases, the periodicity of the transmission opportunities includes a number of symbols, a number of slots, a number of bandwidth parts, or a combination thereof. In some cases, transmission opportunity identifier 935 may be a processor (e.g., a transceiver processor, or a radio processor, or a receiver processor). The processor may be coupled with memory and execute instructions stored in the memory that enable the processor to perform or facilitate the features discussed herein.

Data manager 940 may receive a data transmission based on the resource grant. In some cases, data manager 940 may be a processor (e.g., a transceiver processor, or a radio processor, or a receiver processor). The processor may be coupled with memory and execute instructions stored in the memory that enable the processor to perform or facilitate the features discussed herein.

Figure 10:
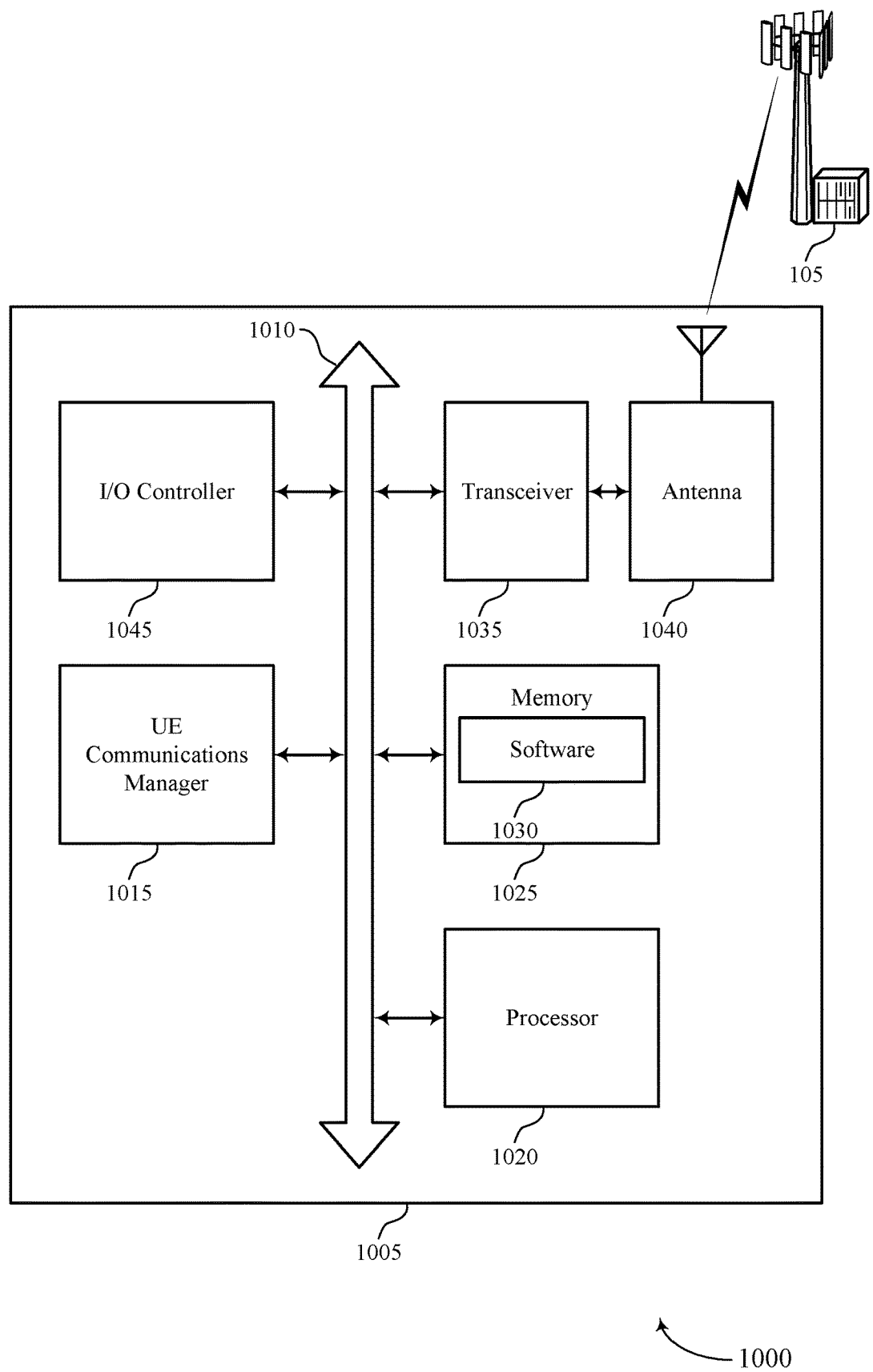
FIG. 10 illustrates a diagram of a system including a UE that supports reference signal transmission window and timing considerations in accordance with aspects of the present disclosure.

FIG. 10 shows a diagram of a system 1000 including a wireless device 1005 that supports reference signal transmission window and timing considerations in accordance with aspects of the present disclosure. Wireless device 1005 may be an example of or include the components of wireless device 705, wireless device 805, or a UE 115 as described above, e.g., with reference to FIGS. 7 and 8. Wireless device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Wireless device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting reference signal transmission window and timing considerations).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support reference signal transmission window and timing considerations. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device 1005 may include a single antenna 1040. However, in some cases the device 1005 may have more than one antenna 1040, which may be capable of concurrently transmitting or receiving multiple wireless transmissions.

I/O controller 1045 may manage input and output signals for wireless device 1005. I/O controller 1045 may also manage peripherals not integrated into wireless device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with wireless device 1005 via I/O controller 1045 or via hardware components controlled by I/O controller 1045.

Figure 11:
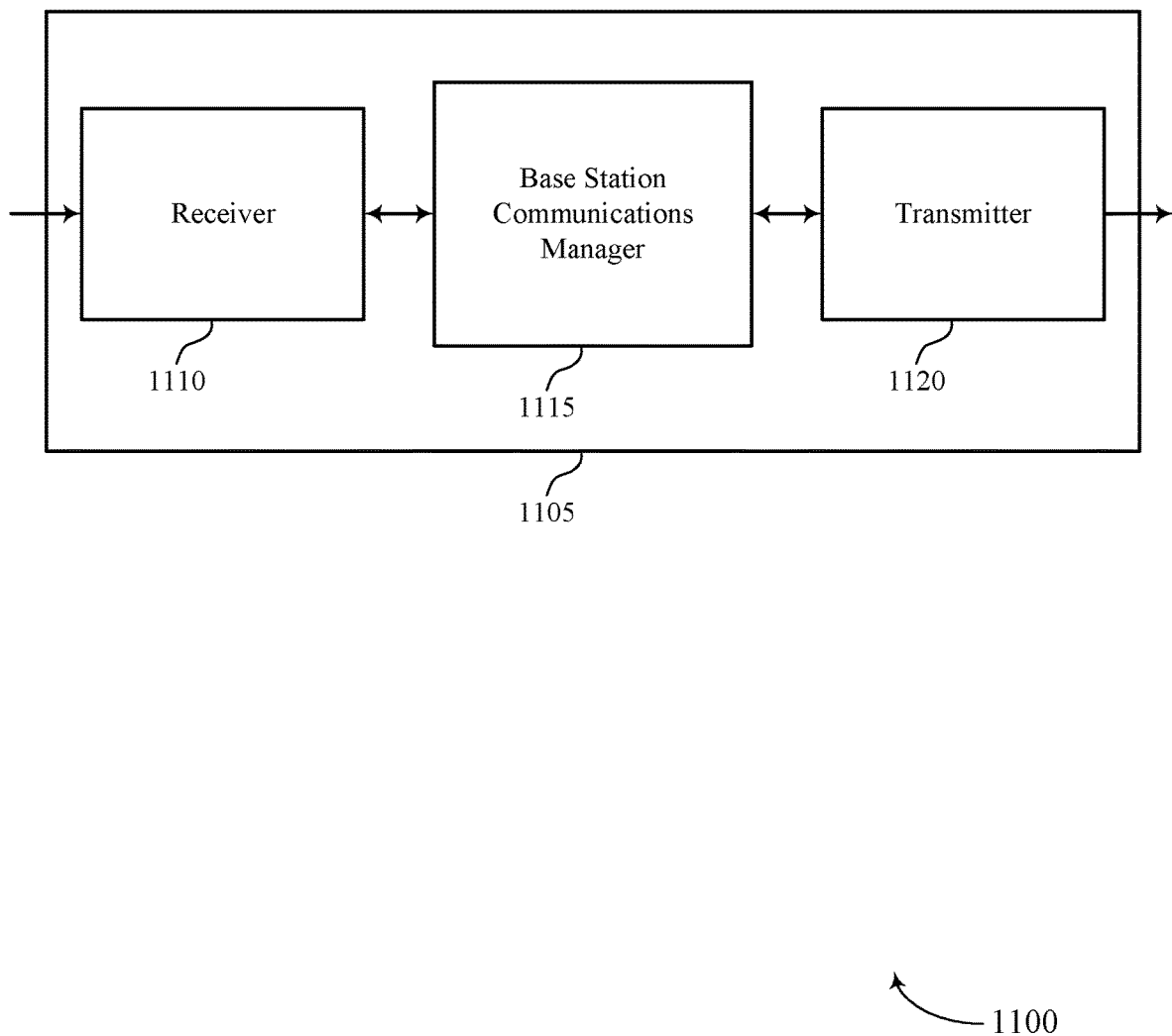
FIGS. 11 and 12 show block diagrams of a device that supports reference signal transmission window and timing considerations in accordance with aspects of the present disclosure.

FIG. 11 shows a block diagram 1100 of a wireless device 1105 that supports reference signal transmission window and timing considerations in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include one or more processors, memory coupled with the one or more processors, and instructions stored in the memory that are executable by the one or more processors to enable the one or more processors to perform the features discussed herein. Each of these components may be in communication with one another (e.g., via one or more buses).

Receiver 1110 may receive information such as packets, user data, or control information associated with various information channels (e.g., control channels, data channels, and information related to reference signal transmission window and timing considerations, etc.). Information may be passed on to other components of the wireless device 1105. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14. Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may transmit, to a UE 115, a resource grant indicating a reference signal configuration. In some cases, the reference signal configuration may include an indication of a use case for the reference signal, and the indicated use case may include an uplink channel state information acquisition, or a downlink channel state information acquisition, or an uplink non-codebook-based precoding, or an uplink codebook-based precoding, or an uplink analog beamforming. In some cases, the reference signal configuration may include a first timing offset for a first component carrier and a second timing offset for a second component carrier, and the first component carrier and the second component carrier operate in different radio frequency spectrum bands. In some cases, the reference signal may include a sounding reference signal. Base station communications manager 1115 may determine a timing offset relative to the resource grant based on the reference signal configuration. Base station communications manager 1115 may receive a reference signal based on the timing offset.

Transmitter 1120 may transmit signals generated by other components of the wireless device 1105. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
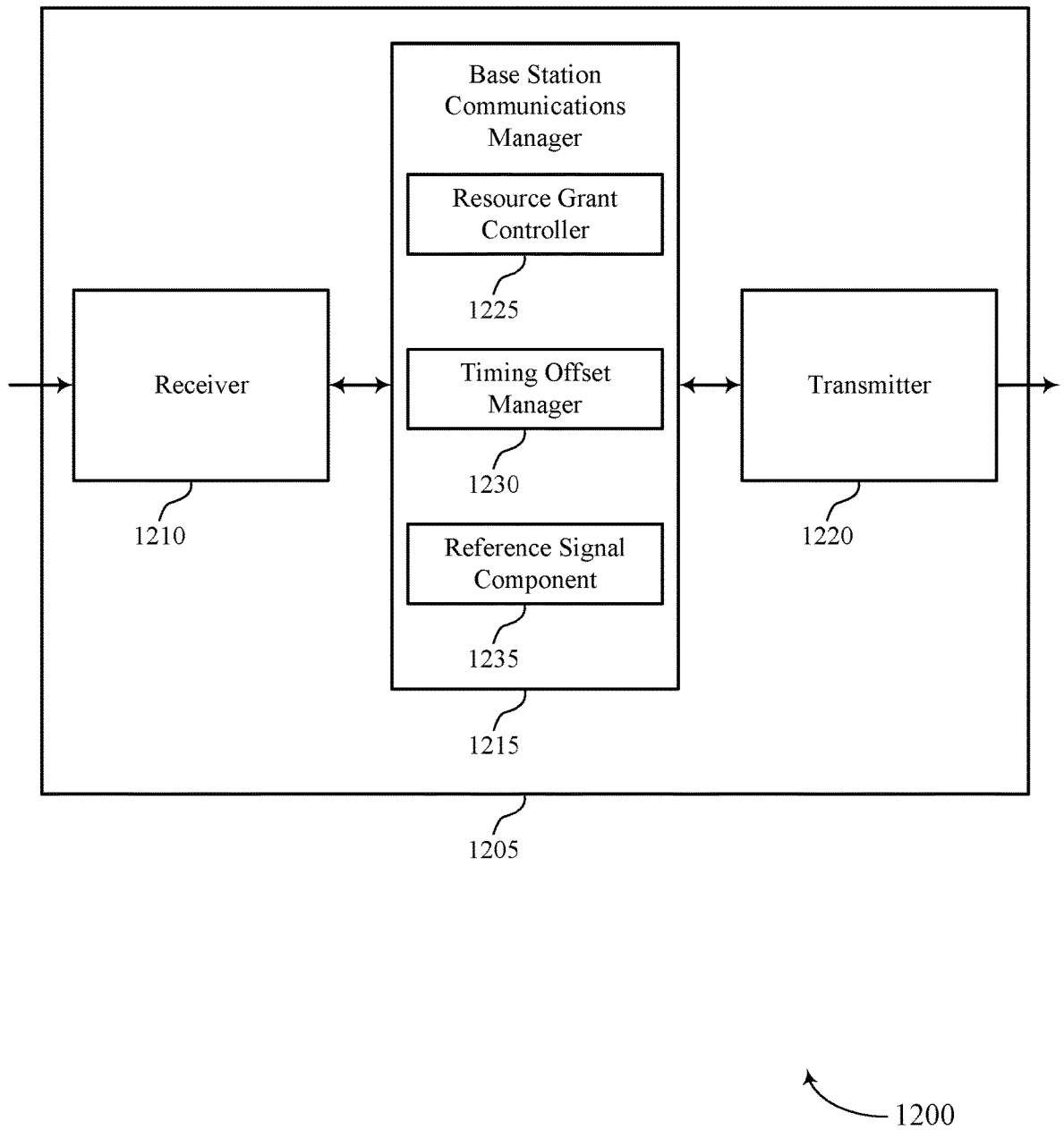

FIG. 12 shows a block diagram 1200 of a wireless device 1205 that supports reference signal transmission window and timing considerations in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to reference signal transmission window and timing considerations, etc.). Information may be passed on to other components of the wireless device 1205. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include resource grant controller 1225, timing offset manager 1230, and reference signal component 1235. In some cases, base station communications manager 1215 may be a processor. (e.g., a transceiver processor, or a radio processor, or a receiver processor. The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the wireless device 1205. A radio processor may be collocated with and/or communicate with (e.g., direct the operations of) a radio (e.g., an LTE radio or a Wi-Fi radio) of the wireless device 1205. A receiver processor may be collocated with and/or communicate with (e.g., direct the operations of) a receiver of the wireless device 1205.

Resource grant controller 1225 may transmit, to a UE 115, a resource grant indicating a reference signal configuration. Resource grant controller 1225 may indicate the reference signal configuration in a control transmission that precedes the resource grant. In some cases, resource grant controller 1225 may be a processor (e.g., a transceiver processor, or a radio processor, or a receiver processor). In some cases, the reference signal configuration may include an indication of a use case for the reference signal, and the indicated use case may include an uplink channel state information acquisition, or a downlink channel state information acquisition, or an uplink non-codebook-based precoding, or an uplink codebook-based precoding, or an uplink analog beamforming. In some cases, the reference signal configuration may include a first timing offset for a first component carrier and a second timing offset for a second component carrier, and the first component carrier and the second component carrier operate in different radio frequency spectrum bands. In some cases, the reference signal may include a sounding reference signal. The processor may be coupled with memory and execute instructions stored in the memory that enable the processor to perform or facilitate the features discussed herein.

Timing offset manager 1230 may determine a timing offset relative to the resource grant based on the reference signal configuration. Timing offset manager 1230 may receive an indication of a processing capability of the UE 115. In some cases, the timing offset is based on the processing capability of the UE 115, a delay associated with the reference signal configuration, or a combination thereof. In some cases, a duration of the timing offset is based on a directionality of the resource grant, the directionality of the resource grant being downlink or uplink. In some cases, timing offset manager 1230 may be a processor (e.g., a transceiver processor, or a radio processor, or a receiver processor). The processor may be coupled with memory and execute instructions stored in the memory that enable the processor to perform or facilitate the features discussed herein.

Reference signal component 1235 may receive a reference signal based on the timing offset. Reference signal component 1235 may transmit a CSI-RS based on the reference signal configuration. In some cases, reference signal component 1235 may be a processor (e.g., a transceiver processor, or a radio processor, or a receiver processor). The processor may be coupled with memory and execute instructions stored in the memory that enable the processor to perform or facilitate the features discussed herein.

Transmitter 1220 may transmit signals generated by other components of the wireless device 1205. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
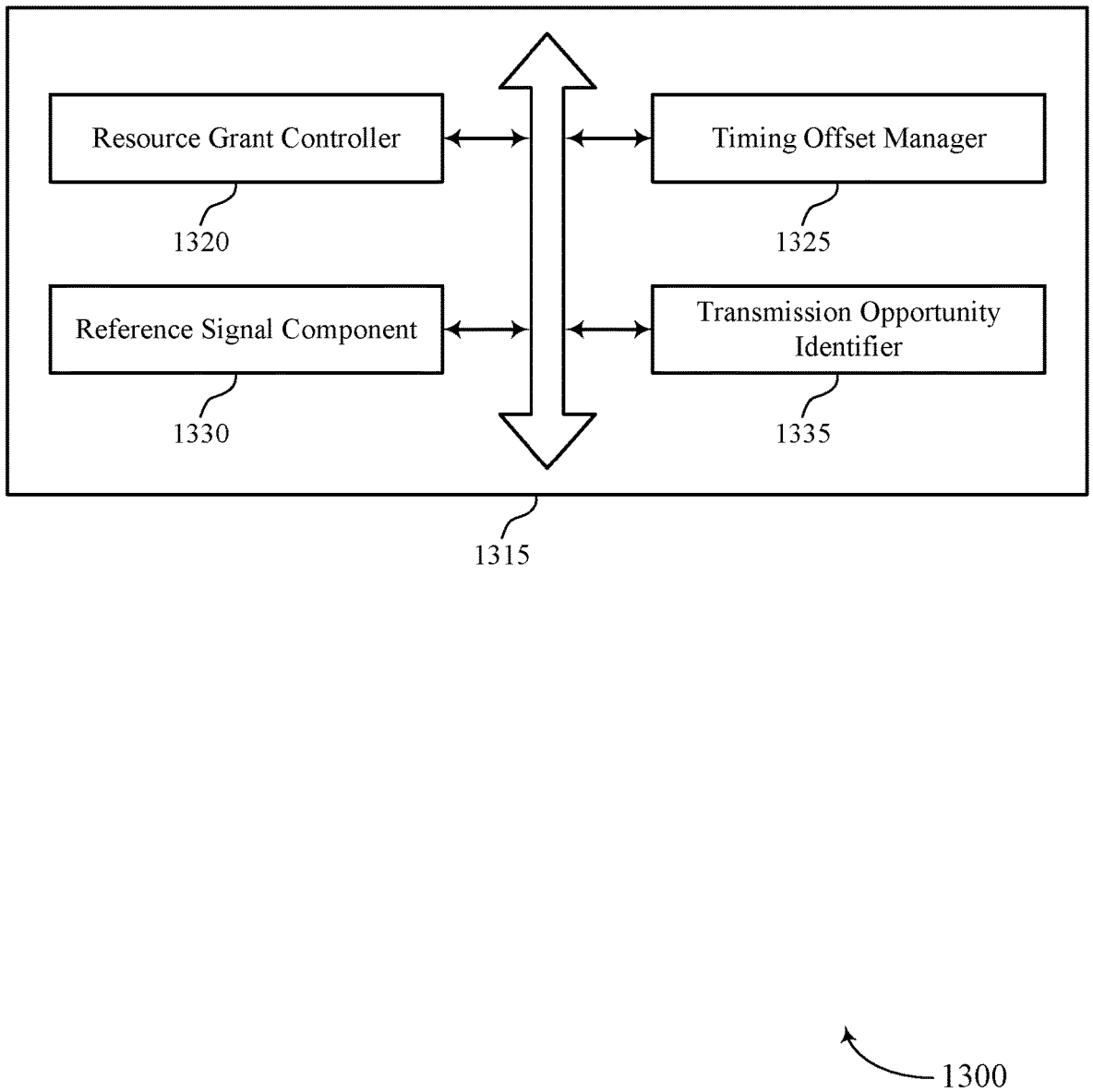
FIG. 13 shows a block diagrams of a base station communications manager that supports reference signal transmission window and timing considerations in accordance with aspects of the present disclosure.

FIG. 13 shows a block diagram 1300 of a base station communications manager 1315 that supports reference signal transmission window and timing considerations in accordance with aspects of the present disclosure. The base station communications manager 1315 may be an example of aspects of a base station communications manager 1115, 1215, and 1415 described with reference to FIGS. 11, 12, and 14. The base station communications manager 1315 may include resource grant controller 1320, timing offset manager 1325, reference signal component 1330, and transmission opportunity identifier 1335. Each of these modules may communicate, directly or indirectly, with one another (e.g., via one or more buses). In some cases, base station communications manager 1315 may be a processor. (e.g., a transceiver processor, or a radio processor, or a receiver processor. The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

Resource grant controller 1320 may transmit, to a UE 115, a resource grant indicating a reference signal configuration. Resource grant controller 1320 may indicate the reference signal configuration in a control transmission that precedes the resource grant. In some cases, the reference signal configuration may include an indication of a use case for the reference signal, and the indicated use case may include an uplink channel state information acquisition, or a downlink channel state information acquisition, or an uplink non-codebook-based precoding, or an uplink codebook-based precoding, or an uplink analog beamforming. In some cases, the reference signal configuration may include a first timing offset for a first component carrier and a second timing offset for a second component carrier, and the first component carrier and the second component carrier operate in different radio frequency spectrum bands. In some cases, the reference signal may include a sounding reference signal. In some cases, resource grant controller 1320 may be a processor (e.g., a transceiver processor, or a radio processor, or a receiver processor). The processor may be coupled with memory and execute instructions stored in the memory that enable the processor to perform or facilitate the features discussed herein.

Timing offset manager 1325 may determine a timing offset relative to the resource grant based on the reference signal configuration. Timing offset manager 1325 may receive an indication of a processing capability of the UE 115. In some cases, the timing offset is based on the processing capability of the UE 115, a delay associated with the reference signal configuration, or a combination thereof. In some cases, a duration of the timing offset is based on a directionality of the resource grant, the directionality of the resource grant being downlink or uplink. In some cases, timing offset manager 1325 may be a processor (e.g., a transceiver processor, or a radio processor, or a receiver processor). The processor may be coupled with memory and execute instructions stored in the memory that enable the processor to perform or facilitate the features discussed herein.

Reference signal component 1330 may receive a reference signal based on the timing offset. Reference signal component 1330 may transmit a CSI-RS based on the reference signal configuration. In some cases, reference signal component 1330 may be a processor (e.g., a transceiver processor, or a radio processor, or a receiver processor). The processor may be coupled with memory and execute instructions stored in the memory that enable the processor to perform or facilitate the features discussed herein.

Transmission opportunity identifier 1335 may identify a transmission opportunity window including a plurality of transmission opportunities based on the timing offset, where the reference signal is received during a transmission opportunity of the plurality of transmission opportunities. Transmission opportunity identifier 1335 may determine a duration of the transmission opportunity window or a periodicity of the transmission opportunities based on the reference signal configuration. In some cases, the periodicity of the transmission opportunities includes a number of symbols, a number of slots, a number of bandwidth parts, or a combination thereof. In some cases, transmission opportunity identifier 1335 may be a processor (e.g., a transceiver processor, or a radio processor, or a receiver processor). The processor may be coupled with memory and execute instructions stored in the memory that enable the processor to perform or facilitate the features discussed herein.

Figure 14:
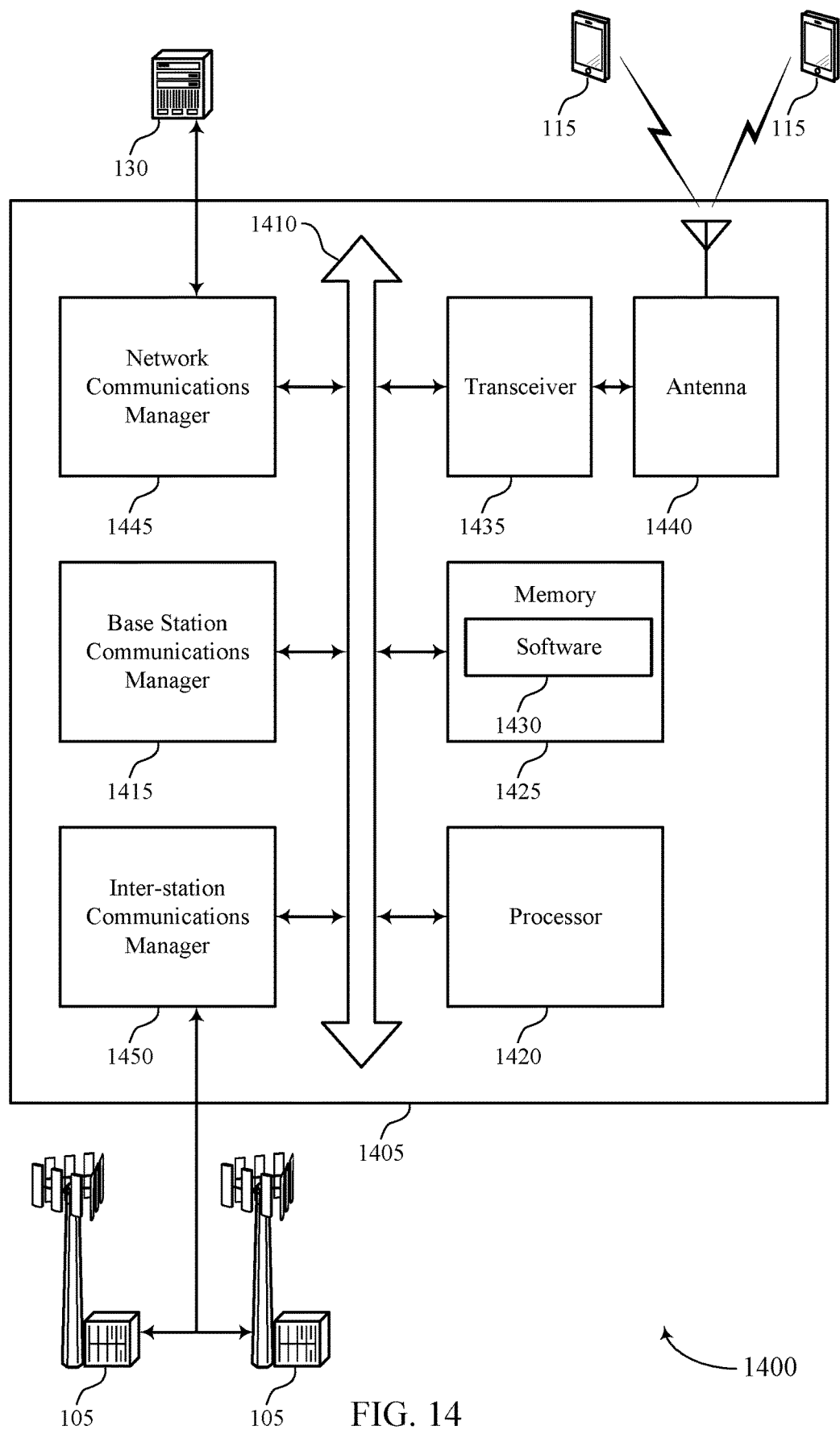
FIG. 14 illustrates a diagram of a system including a base station that supports reference signal transmission window and timing considerations in accordance with aspects of the present disclosure.

FIG. 14 shows a diagram of a system 1400 including a wireless device 1405 that supports reference signal transmission window and timing considerations in accordance with aspects of the present disclosure. Wireless device 1405 may be an example of or include the components of base station 105 as described above, e.g., with reference to FIG. 1. Wireless device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Wireless device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting reference signal transmission window and timing considerations).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support reference signal transmission window and timing considerations. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device 1405 may include a single antenna 1440. However, in some cases the wireless device 1405 may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
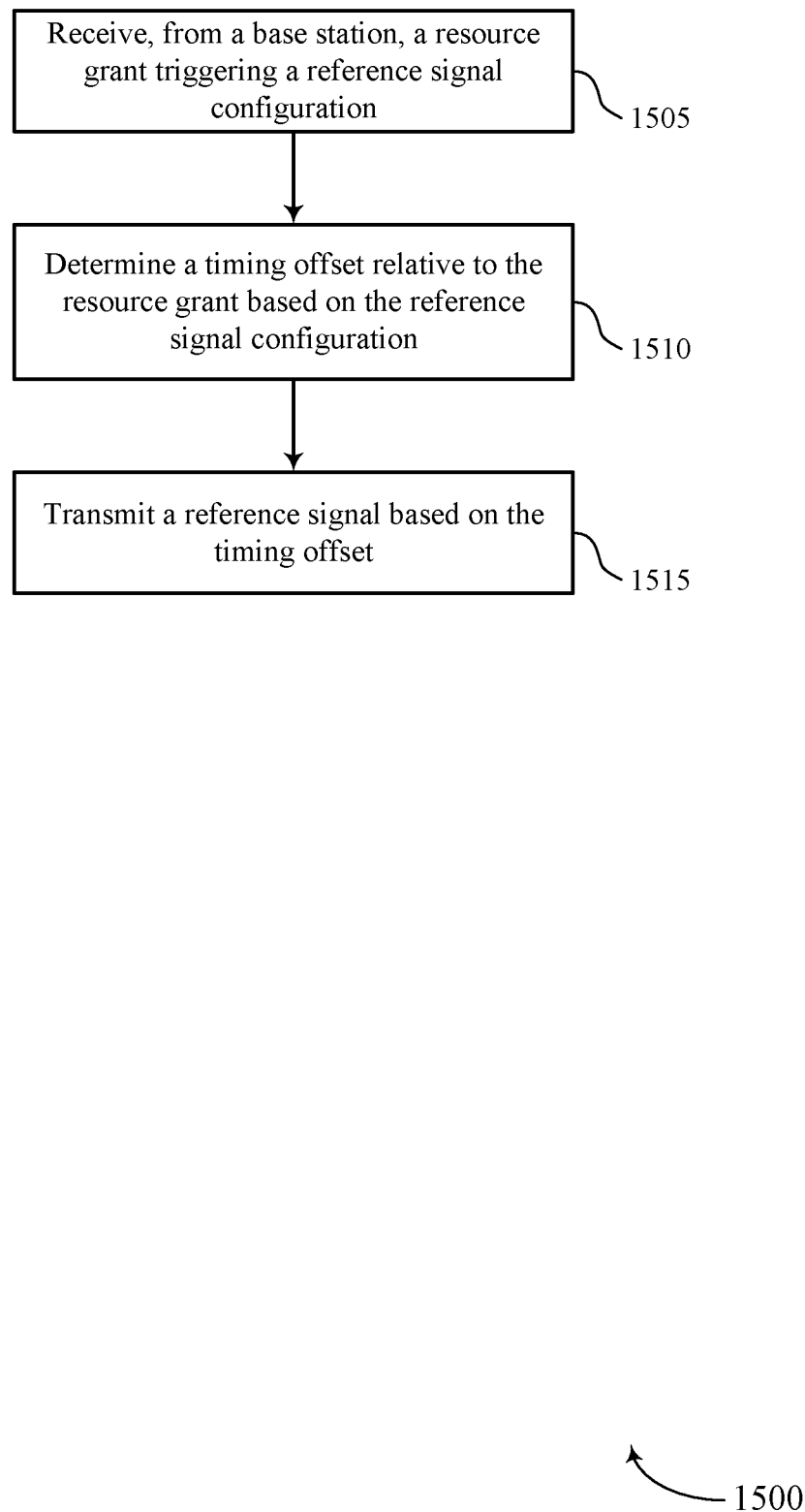
FIGS. 15 through 21 illustrate methods for reference signal transmission window and timing considerations in accordance with aspects of the present disclosure.

FIG. 15 shows a flowchart illustrating a method 1500 for reference signal transmission window and timing considerations in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may receive, from a base station 105, a resource grant triggering a reference signal configuration. The operations of 1505 may be performed according to the methods described herein. In some examples, aspects of the operations of 1505 may be performed by a resource grant manager as described with reference to FIGS. 7 through 10.

At 1510, the UE 115 may determine a timing offset relative to the resource grant based at least in part on the reference signal configuration. The operations of 1510 may be performed according to the methods described herein. In some examples, aspects of the operations of 1510 may be performed by a timing offset component as described with reference to FIGS. 7 through 10.

At 1515, the UE 115 may transmit a reference signal based at least in part on the timing offset. The operations of 1515 may be performed according to the methods described herein. In some examples, aspects of the operations of 1515 may be performed by a reference signal manager as described with reference to FIGS. 7 through 10.

Figure 16:
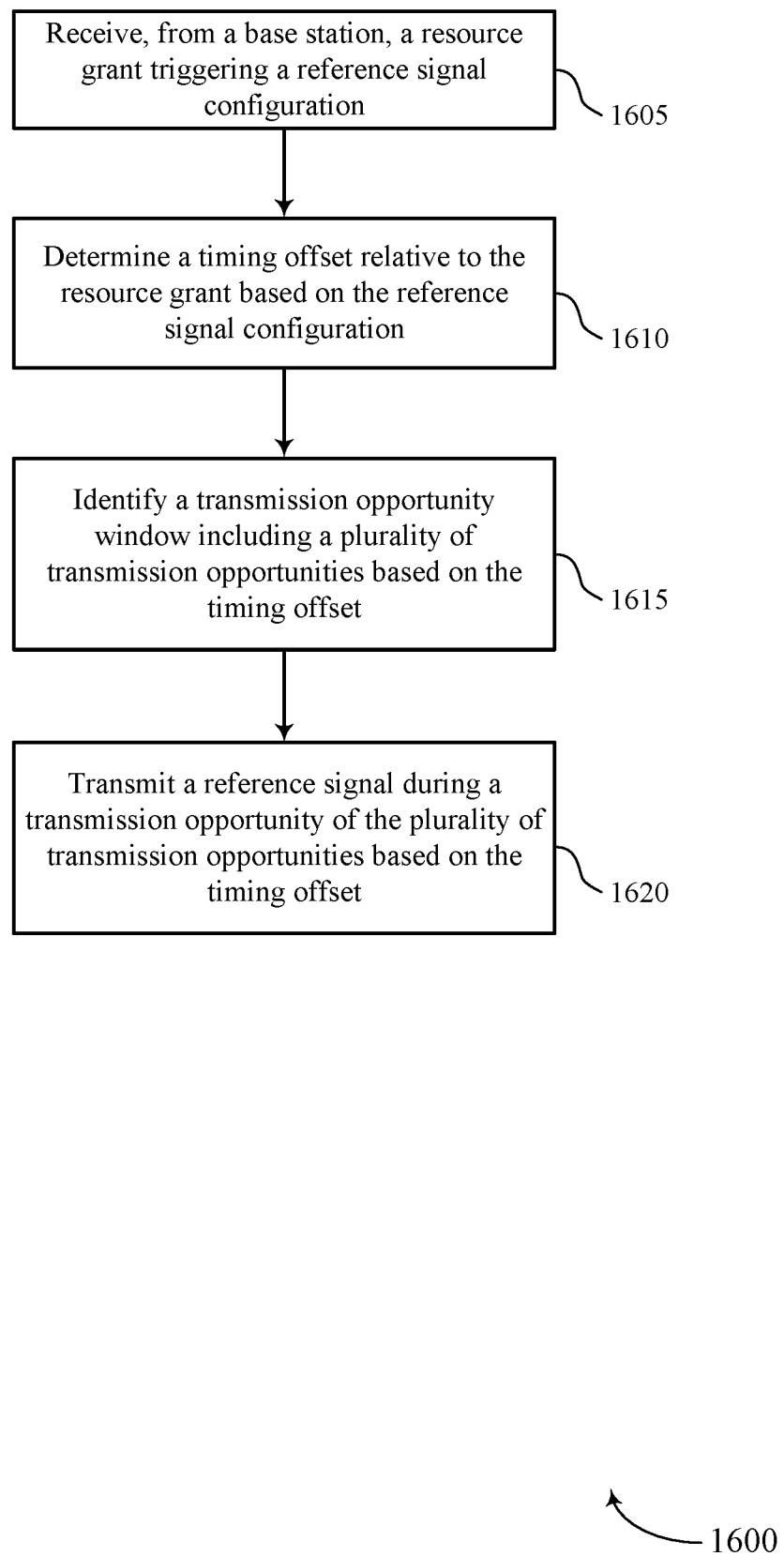

FIG. 16 shows a flowchart illustrating a method 1600 for reference signal transmission window and timing considerations in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1605, the UE 115 may receive, from a base station 105, a resource grant triggering a reference signal configuration. The operations of 1605 may be performed according to the methods described herein. In some examples, aspects of the operations of 1605 may be performed by a resource grant manager as described with reference to FIGS. 7 through 10.

At 1610, the UE 115 may determine a timing offset relative to the resource grant based at least in part on the reference signal configuration. The operations of 1610 may be performed according to the methods described herein. In some examples, aspects of the operations of 1610 may be performed by a timing offset component as described with reference to FIGS. 7 through 10.

At 1615, the UE 115 may identify a transmission opportunity window including a plurality of transmission opportunities based at least in part on the timing offset. The operations of 1615 may be performed according to the methods described herein. In some examples, aspects of the operations of 1615 may be performed by a transmission opportunity identifier as described with reference to FIGS. 7 through 10.

At 1620, the UE 115 may transmit a reference signal during a transmission opportunity of the set of transmission opportunities based at least in part on the timing offset. The operations of 1620 may be performed according to the methods described herein. In some examples, aspects of the operations of 1620 may be performed by a reference signal manager as described with reference to FIGS. 7 through 10.

Figure 17:
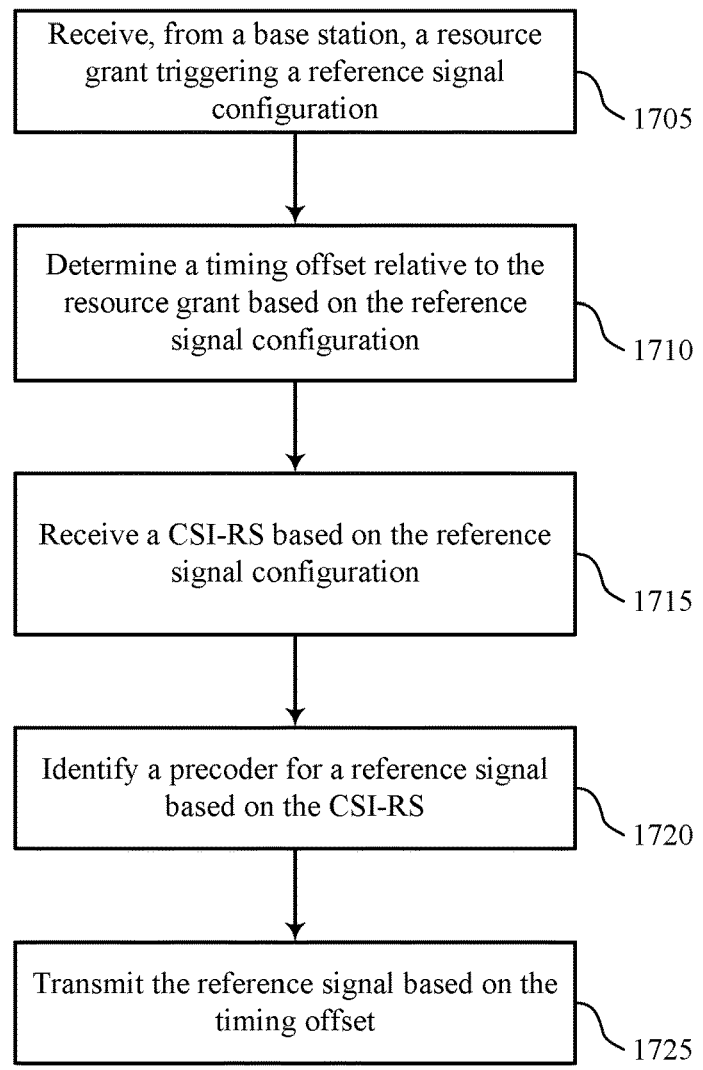

FIG. 17 shows a flowchart illustrating a method 1700 for reference signal transmission window and timing considerations in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may receive, from a base station 105, a resource grant triggering a reference signal configuration. The operations of 1705 may be performed according to the methods described herein. In some examples, aspects of the operations of 1705 may be performed by a resource grant manager as described with reference to FIGS. 7 through 10.

At 1710, the UE 115 may determine a timing offset relative to the resource grant based at least in part on the reference signal configuration. The operations of 1710 may be performed according to the methods described herein. In some examples, aspects of the operations of 1710 may be performed by a timing offset component as described with reference to FIGS. 7 through 10.

At 1715, the UE 115 may receive a CSI-RS based at least in part on the reference signal configuration. The operations of 1715 may be performed according to the methods described herein. In some examples, aspects of the operations of 1715 may be performed by a reference signal manager as described with reference to FIGS. 7 through 10.

At 1720, the UE 115 may identify a precoder for a reference signal based at least in part on the CSI-RS. The operations of 1720 may be performed according to the methods described herein. In some examples, aspects of the operations of 1720 may be performed by a reference signal manager as described with reference to FIGS. 7 through 10.

At 1725, the UE 115 may transmit the reference signal based at least in part on the timing offset. The operations of 1725 may be performed according to the methods described herein. In some examples, aspects of the operations of 1725 may be performed by a reference signal manager as described with reference to FIGS. 7 through 10.

Figure 18:
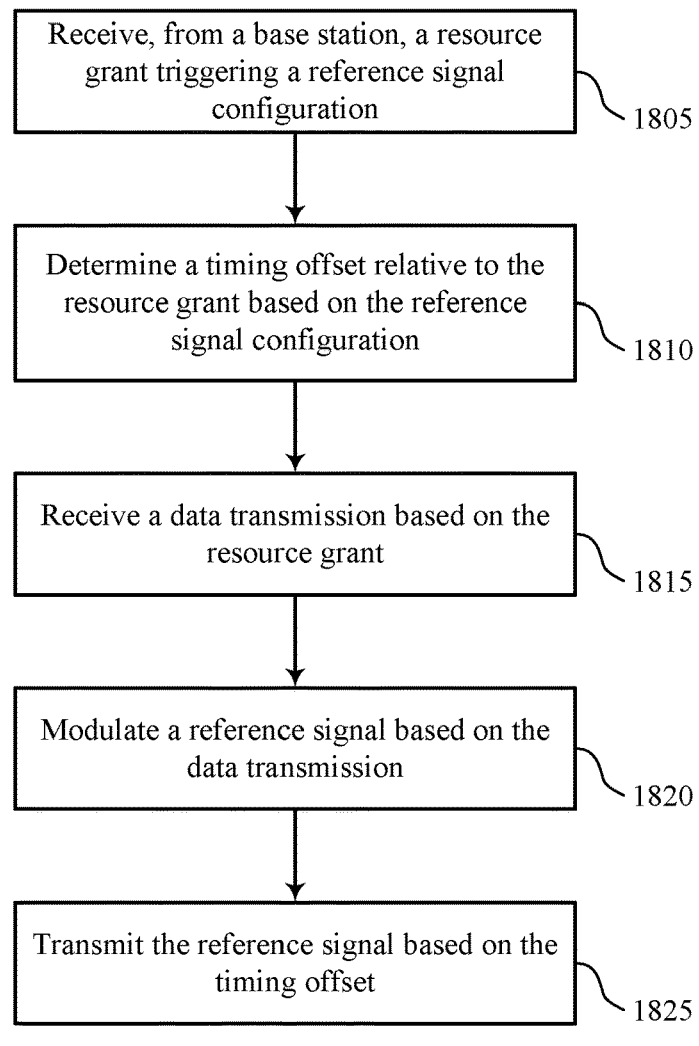

FIG. 18 shows a flowchart illustrating a method 1800 for reference signal transmission window and timing considerations in accordance with aspects of the present disclosure. The operations of method 1800 may be implemented by a UE 115 or its components as described herein. For example, the operations of method 1800 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1805, the UE 115 may receive, from a base station 105, a resource grant triggering a reference signal configuration. The operations of 1805 may be performed according to the methods described herein. In some examples, aspects of the operations of 1805 may be performed by a resource grant manager as described with reference to FIGS. 7 through 10.

At 1810, the UE 115 may determine a timing offset relative to the resource grant based at least in part on the reference signal configuration. The operations of 1810 may be performed according to the methods described herein. In some examples, aspects of the operations of 1810 may be performed by a timing offset component as described with reference to FIGS. 7 through 10.

At 1815, the UE 115 may receive a data transmission based at least in part on the resource grant. The operations of 1815 may be performed according to the methods described herein. In some examples, aspects of the operations of 1815 may be performed by a data manager as described with reference to FIGS. 7 through 10.

At 1820, the UE 115 may modulate a reference signal based at least in part on the data transmission. The operations of 1820 may be performed according to the methods described herein. In some examples, aspects of the operations of 1820 may be performed by a reference signal manager as described with reference to FIGS. 7 through 10.

At 1825, the UE 115 may transmit the reference signal based at least in part on the timing offset. The operations of 1825 may be performed according to the methods described herein. In some examples, aspects of the operations of 1825 may be performed by a reference signal manager as described with reference to FIGS. 7 through 10.

Figure 19:
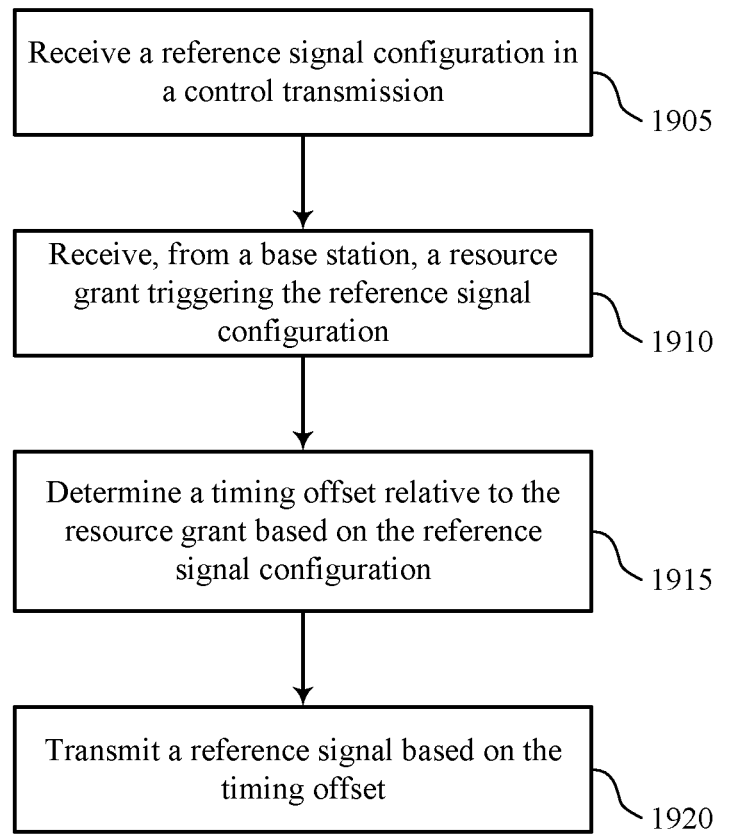

FIG. 19 shows a flowchart illustrating a method 1900 for reference signal transmission window and timing considerations in accordance with aspects of the present disclosure. The operations of method 1900 may be implemented by a UE 115 or its components as described herein. For example, the operations of method 1900 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1905, the UE 115 may receive the reference signal configuration in a control transmission. The operations of 1905 may be performed according to the methods described herein. In some examples, aspects of the operations of 1905 may be performed by a resource grant manager as described with reference to FIGS. 7 through 10.

At 1910, the UE 115 may receive, from a base station 105, a resource grant triggering the reference signal configuration. The operations of 1910 may be performed according to the methods described herein. In some examples, aspects of the operations of 1910 may be performed by a resource grant manager as described with reference to FIGS. 7 through 10.

At 1915, the UE 115 may determine a timing offset relative to the resource grant based at least in part on the reference signal configuration. The operations of 1915 may be performed according to the methods described herein. In some examples, aspects of the operations of 1915 may be performed by a timing offset component as described with reference to FIGS. 7 through 10.

At 1920, the UE 115 may transmit a reference signal based at least in part on the timing offset. The operations of 1920 may be performed according to the methods described herein. In some examples, aspects of the operations of 1920 may be performed by a reference signal manager as described with reference to FIGS. 7 through 10.

Figure 20:
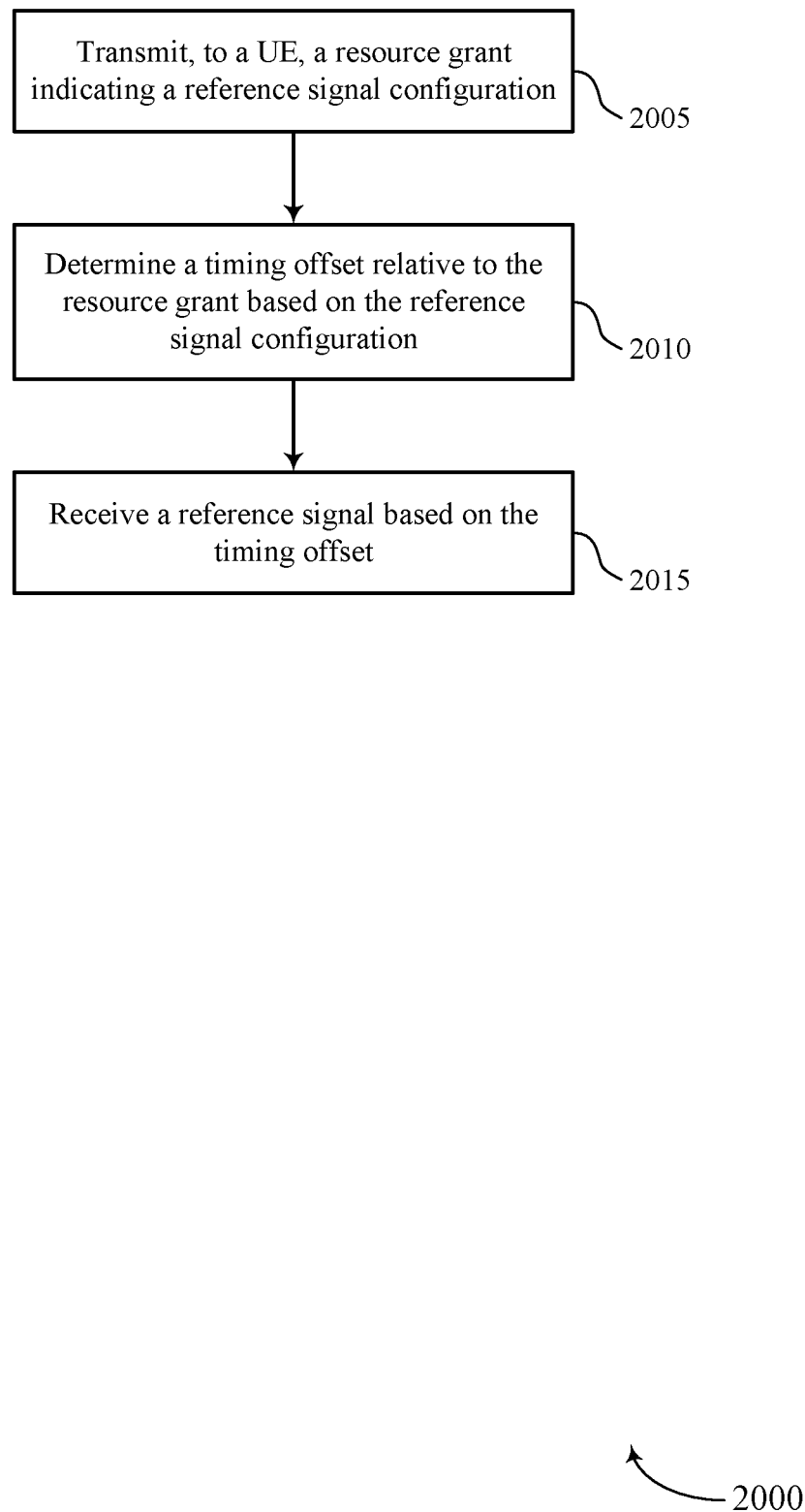

FIG. 20 shows a flowchart illustrating a method 2000 for reference signal transmission window and timing considerations in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2005, the base station 105 may transmit, to a UE 115, a resource grant indicating a reference signal configuration. The operations of 2005 may be performed according to the methods described herein. In some examples, aspects of the operations of 2005 may be performed by a resource grant controller as described with reference to FIGS. 11 through 14.

At 2010, the base station 105 may determine a timing offset relative to the resource grant based at least in part on the reference signal configuration. The operations of 2010 may be performed according to the methods described herein. In some examples, aspects of the operations of 2010 may be performed by a timing offset manager as described with reference to FIGS. 11 through 14.

At 2015, the base station 105 may receive a reference signal based at least in part on the timing offset. The operations of 2015 may be performed according to the methods described herein. In some examples, aspects of the operations of 2015 may be performed by a reference signal component as described with reference to FIGS. 11 through 14.

Figure 21:
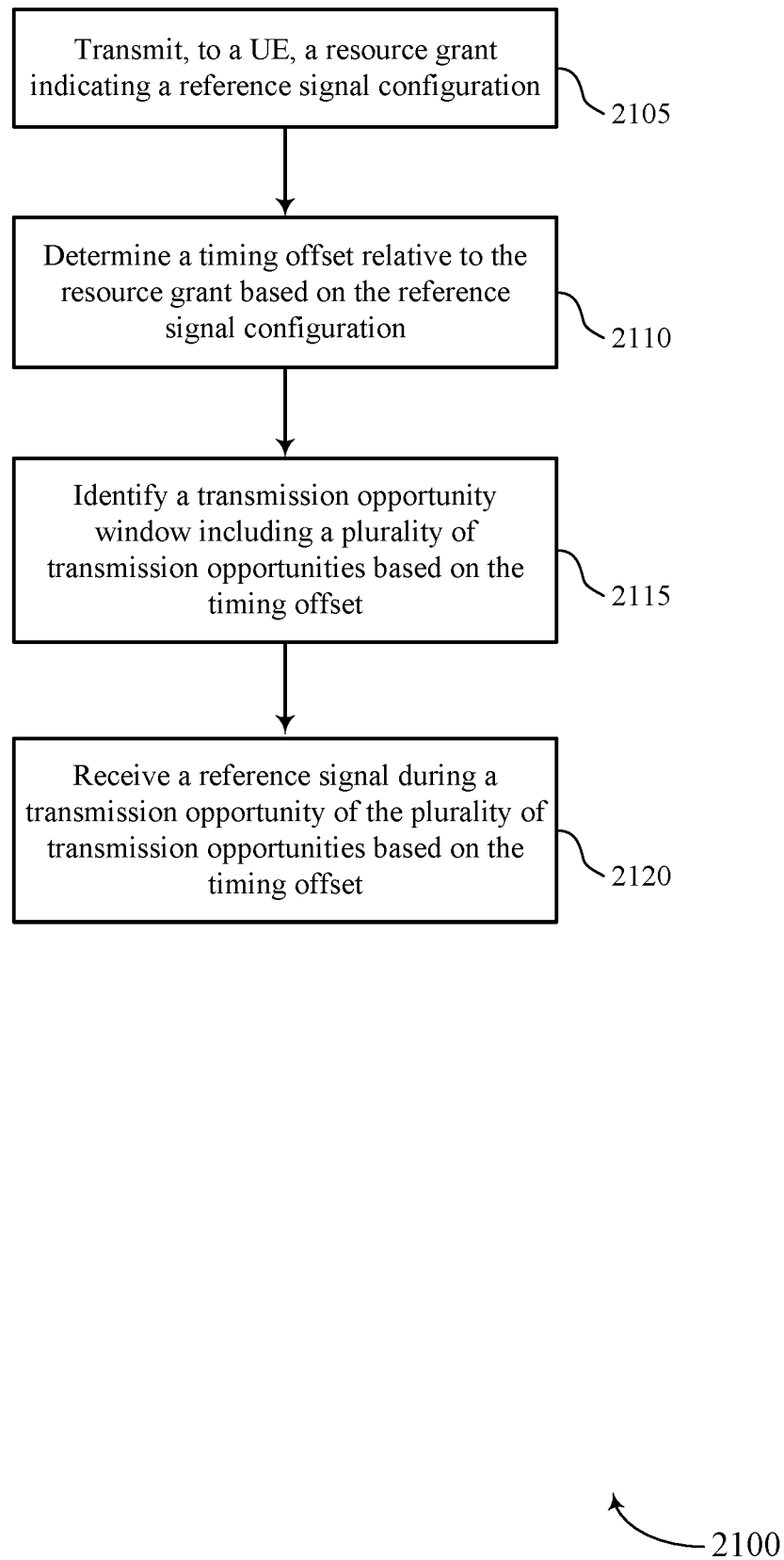

FIG. 21 shows a flowchart illustrating a method 2100 for reference signal transmission window and timing considerations in accordance with aspects of the present disclosure. The operations of method 2100 may be implemented by a base station 105 or its components as described herein. For example, the operations of method 2100 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2105, the base station 105 may transmit, to a UE 115, a resource grant indicating a reference signal configuration. The operations of 2105 may be performed according to the methods described herein. In some examples, aspects of the operations of 2105 may be performed by a resource grant controller as described with reference to FIGS. 11 through 14.

At 2110, the base station 105 may determine a timing offset relative to the resource grant based at least in part on the reference signal configuration. The operations of 2110 may be performed according to the methods described herein. In some examples, aspects of the operations of 2110 may be performed by a timing offset manager as described with reference to FIGS. 11 through 14.

At 2115, the base station 105 may identify a transmission opportunity window including a plurality of transmission opportunities based at least in part on the timing offset. The operations of 2115 may be performed according to the methods described herein. In some examples, aspects of the operations of 2115 may be performed by a transmission opportunity identifier as described with reference to FIGS. 11 through 14.

At 2120, the base station 105 may receive a reference signal during a transmission opportunity of the plurality of transmission opportunities based at least in part on the timing offset. The operations of 2120 may be performed according to the methods described herein. In some examples, aspects of the operations of 2120 may be performed by a reference signal component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a base station, a resource grant triggering an aperiodic sounding reference signal configuration;
    determining a timing offset for transmission of an aperiodic sounding reference signal by the UE, wherein the timing offset is relative to the received resource grant and based at least in part on the aperiodic sounding reference signal configuration; and
    transmitting the aperiodic sounding reference signal based at least in part on the determined timing offset.

2. The method of claim 1, further comprising:
    identifying a transmission opportunity window comprising a plurality of transmission opportunities based at least in part on the timing offset, wherein the aperiodic sounding reference signal is transmitted during a transmission opportunity of the plurality of transmission opportunities.

3. The method of claim 2, further comprising:
    determining a duration of the transmission opportunity window or a periodicity of the plurality of transmission opportunities based at least in part on the aperiodic sounding reference signal configuration.

4. The method of claim 3, wherein the periodicity of the plurality of transmission opportunities comprises a number of symbols, a number of slots, a number of bandwidth parts, or a combination thereof.

5. The method of claim 1, further comprising:
    receiving a channel state information reference signal (CSI-RS) based at least in part on the aperiodic sounding reference signal configuration; and
    identifying a precoder for the aperiodic sounding reference signal based at least in part on the CSI-RS.

6. The method of claim 1, wherein the timing offset is based at least in part on a processing capability of the UE, a delay associated with the aperiodic sounding reference signal configuration, or a combination thereof.

7. The method of claim 6, further comprising:
    indicating the processing capability of the UE to the base station.

8. The method of claim 1, further comprising:
    receiving a data transmission based at least in part on the resource grant; and
    modulating the aperiodic sounding reference signal based at least in part on the data transmission.

9. The method of claim 1, further comprising:
    receiving the aperiodic sounding reference signal configuration in a control transmission that precedes the resource grant.

10. The method of claim 1, wherein a duration of the timing offset is based at least in part on a directionality of the resource grant, the directionality of the resource grant comprising downlink or uplink.

11. The method of claim 1, wherein the aperiodic sounding reference signal configuration comprises an indication of a use case for the aperiodic sounding reference signal.

12. The method of claim 11, wherein the indicated use case comprises an uplink channel state information acquisition, or a downlink channel state information acquisition, or an uplink non-codebook-based precoding, or an uplink codebook-based precoding, or an uplink analog beamforming.

13. The method of claim 1, wherein the aperiodic sounding reference signal configuration comprises a first timing offset for a first component carrier and a second timing offset for a second component carrier.

14. The method of claim 13, wherein the first component carrier and the second component carrier operate in different radio frequency spectrum bands.

15. The method of claim 1, wherein the aperiodic sounding reference signal transmitted by the UE based at least in part on the determined timing offset comprises a sounding reference signal.

16. A method for wireless communication at a base station, comprising:
- transmitting, to a user equipment (UE), a resource grant indicating an aperiodic sounding reference signal configuration;
- determining a timing offset for transmission of an aperiodic sounding reference signal by the UE, wherein the timing offset is relative to the transmitted resource grant and based at least in part on the aperiodic sounding reference signal configuration; and
- receiving the aperiodic sounding reference signal based at least in part on the determined timing offset.

17. The method of claim 16, further comprising:
- identifying a transmission opportunity window comprising a plurality of transmission opportunities based at least in part on the timing offset, wherein the aperiodic sounding reference signal is received during a transmission opportunity of the plurality of transmission opportunities.

18. The method of claim 16, further comprising:
- transmitting a channel state information reference signal (CSI-RS) based at least in part on the aperiodic sounding reference signal configuration.

19. The method of claim 16, wherein the timing offset is based at least in part on a processing capability of the UE, a delay associated with the aperiodic sounding reference signal configuration, or a combination thereof.

20. The method of claim 16, further comprising:
- indicating the aperiodic sounding reference signal configuration in a control transmission that precedes the resource grant.

21. The method of claim 16, wherein a duration of the timing offset is based at least in part on a directionality of the resource grant, the directionality of the resource grant comprising downlink or uplink.

22. The method of claim 16, wherein the aperiodic sounding reference signal configuration comprises an indication of a use case for the aperiodic sounding reference signal.

23. The method of claim 16, wherein the aperiodic sounding reference signal configuration comprises a first timing offset for a first component carrier and a second timing offset for a second component carrier.

24. An apparatus for wireless communication at a user equipment (UE), comprising:
- a processor;
- memory coupled with the processor; and
- instructions stored in the memory and executable by the processor to cause the apparatus to:
  - receive, from a base station, a resource grant triggering an aperiodic sounding reference signal configuration;
  - determine a timing offset for transmission of an aperiodic sounding reference signal by the UE, wherein the timing offset is relative to the received resource grant and based at least in part on the aperiodic sounding reference signal configuration; and
  - transmit the aperiodic sounding reference signal based at least in part on the determined timing offset.

25. The apparatus of claim 24, wherein the instructions are further executable by the processor to cause the apparatus to:
- identify a transmission opportunity window comprising a plurality of transmission opportunities based at least in part on the timing offset, wherein the aperiodic sounding reference signal is transmitted during a transmission opportunity of the plurality of transmission opportunities.

26. The apparatus of claim 24, wherein the instructions are further executable by the processor to cause the apparatus to:
- receive a channel state information reference signal (CSI-RS) based at least in part on the aperiodic sounding reference signal configuration; and
- identify a precoder for the aperiodic sounding reference signal based at least in part on the CSI-RS.

27. The apparatus of claim 24, wherein the aperiodic sounding reference signal configuration comprises an indication of a use case for the aperiodic sounding reference signal.

28. The apparatus of claim 24, wherein the aperiodic sounding reference signal configuration comprises a first timing offset for a first component carrier and a second timing offset for a second component carrier.

29. An apparatus for wireless communication at a base station, comprising:
- a processor;
- memory coupled with the processor; and
- instructions stored in the memory and executable by the processor to cause the apparatus to:
  - transmit, to a user equipment (UE), a resource grant indicating an aperiodic sounding reference signal configuration;
  - determine a timing offset for transmission of an aperiodic sounding reference signal by the UE, wherein the timing offset is relative to the transmitted resource grant and based at least in part on the aperiodic sounding reference signal configuration; and
  - receive the aperiodic sounding reference signal based at least in part on the determined timing offset.

30. The apparatus of claim 29, wherein the instructions are further executable by the processor to cause the apparatus to:
- identify a transmission opportunity window comprising a plurality of transmission opportunities based at least in part on the timing offset, wherein the aperiodic sounding reference signal is received during a transmission opportunity of the plurality of transmission opportunities.

* * * * *